US007785539B2

(12) United States Patent
Mirkovic et al.

(10) Patent No.: US 7,785,539 B2
(45) Date of Patent: *Aug. 31, 2010

(54) METHOD OF CONTROLLING A HYDROGEN GENERATOR

(75) Inventors: Vesna R. Mirkovic, Pearland, TX (US); Hongqiao Sun, Sugar Land, TX (US); W. Spencer Wheat, Missouri City, TX (US); Daniel G. Casey, Kingwood, TX (US); Bhaskar Balasubramanian, Houston, TX (US)

(73) Assignee: Texaco Inc., San Ramon, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/015,238

(22) Filed: Dec. 17, 2004

(65) Prior Publication Data

US 2005/0188614 A1 Sep. 1, 2005

Related U.S. Application Data

(63) Continuation-in-part of application No. 10/407,488, filed on Apr. 4, 2003, now Pat. No. 7,318,970.

(51) Int. Cl.
*G05D 7/00* (2006.01)
*G05B 21/00* (2006.01)
*B01J 8/00* (2006.01)

(52) U.S. Cl. ............... 422/105; 422/108; 422/110; 48/197 R; 48/127.7; 48/127.9; 48/61; 700/271; 700/272; 700/273; 700/275

(58) Field of Classification Search .......... 48/61, 48/127.7, 127.9, 197 R; 422/105, 108, 110; 700/271, 272, 273, 275

See application file for complete search history.

(56) References Cited

U.S. PATENT DOCUMENTS 4,673,624 A 6/1987 Hockaday (Continued)

FOREIGN PATENT DOCUMENTS

EP 1160193 12/2001

(Continued)

OTHER PUBLICATIONS

Bonhôte, et al., "Hydrophobic, Highly Conductive Ambient-Temperature Molten Salts," *Inorg. Chem.* 35:1168-1178 (1996).

(Continued)

*Primary Examiner*—N. Bhat
(74) *Attorney, Agent, or Firm*—Melissa Patangia; Frank C. Turner; Williams Morgan & Amerson

(57) ABSTRACT

A method and apparatus for use in generating hydrogen are disclosed. The apparatus includes a fuel processor capable of producing a reformate from a fuel; a hydrogen purifier capable of generating a purified hydrogen gas stream from the reformate; a compressor capable of providing the reformate from the fuel processor to the pressure swing adsorption unit at a desired pressure; and a control system capable of integrating and controlling the operation of the fuel processor, the pressure swing adsorption unit, and the compressor. In another aspect, the invention includes a method for controlling the operation of a purified hydrogen generator, the method comprising: controlling the operation of a hydrogen generator; controlling the operation of a hydrogen purifier; and synchronizing the controlled operation of the hydrogen generator with the controlled operation of the hydrogen purifier.

10 Claims, 15 Drawing Sheets

U.S. PATENT DOCUMENTS

| | | | |
|---|---|---|---|
| 5,731,101 A | 3/1998 | Sherif et al. | |
| 5,827,602 A | 10/1998 | Koch et al. | |
| 6,269,286 B1 | 7/2001 | Tse et al. | |
| 6,294,276 B1* | 9/2001 | Ogino | 429/17 |
| 6,534,950 B2* | 3/2003 | LeBoe | 320/104 |
| 6,682,838 B2 | 1/2004 | Stevens | |
| 6,824,577 B2 | 11/2004 | Deshpande | |
| 6,912,450 B2* | 6/2005 | Fairlie et al. | 700/273 |
| 7,011,693 B2* | 3/2006 | Mallavarapu et al. | 95/22 |
| 7,135,050 B2* | 11/2006 | Asou et al. | 48/127.9 |
| 7,175,928 B2* | 2/2007 | Kuriiwa et al. | 429/22 |
| 7,181,316 B2* | 2/2007 | Fairlie et al. | 700/266 |
| 7,255,949 B2* | 8/2007 | Coors et al. | 429/17 |
| 7,258,704 B2* | 8/2007 | Fujihara et al. | 48/61 |
| 2002/0031692 A1 | 3/2002 | Fuglevand et al. | |
| 2002/0083646 A1 | 7/2002 | Deshpande et al. | |
| 2002/0088740 A1 | 7/2002 | Krause et al. | |
| 2002/0090326 A1 | 7/2002 | Deshpande | |
| 2002/0090327 A1 | 7/2002 | Deshpande | |
| 2002/0090334 A1 | 7/2002 | Stevens et al. | |
| 2002/0094310 A1 | 7/2002 | Krause et al. | |
| 2002/0098129 A1 | 7/2002 | Martin et al. | |
| 2004/0197615 A1 | 10/2004 | Mirkovic et al. | |
| 2006/0068246 A1* | 3/2006 | Matsuo et al. | 429/19 |
| 2006/0083956 A1* | 4/2006 | Ukai et al. | 429/12 |

FOREIGN PATENT DOCUMENTS

| | | | |
|---|---|---|---|
| EP | 1 221 394 | * | 6/2002 |

OTHER PUBLICATIONS

Bowlas, et al., "Liquid-crystalline ionic liquids," *Chem. Commun.* 1625-1626 (1996).

Fannin, Jr., et al., "Properties of 1,3-Dialkylimidazolium Chloride—Aluminum Chloride Ionic Liquids. 2. Phase Transitions, Densities, Electrical Conductivities, and Viscosities," *J. Phys. Chem.* 88:2614-2621 (1984).

Fuller, et al., "Structure of 1-Ethyl-3-methylimidazolium Hexafluorophosphate: Model for Room Temperature Molten Salts," *J. Chem. Soc., Chem. Commun.* 299-300 (1994).

Suarez, et al., "Synthesis and physical-chemical properties of ionic liquids based on 1-n-butyl-3-methylimidazolium cation," *J. Chim. Phys.* 95:1626-1639 (1998).

Wilkes, et al., "Air and Water Stable 1-Ethyl-3-methylimidazolium Based Ionic Liquids," *J. Chem. Soc., Chem. Commun.* 965-967 (1992).

\* cited by examiner

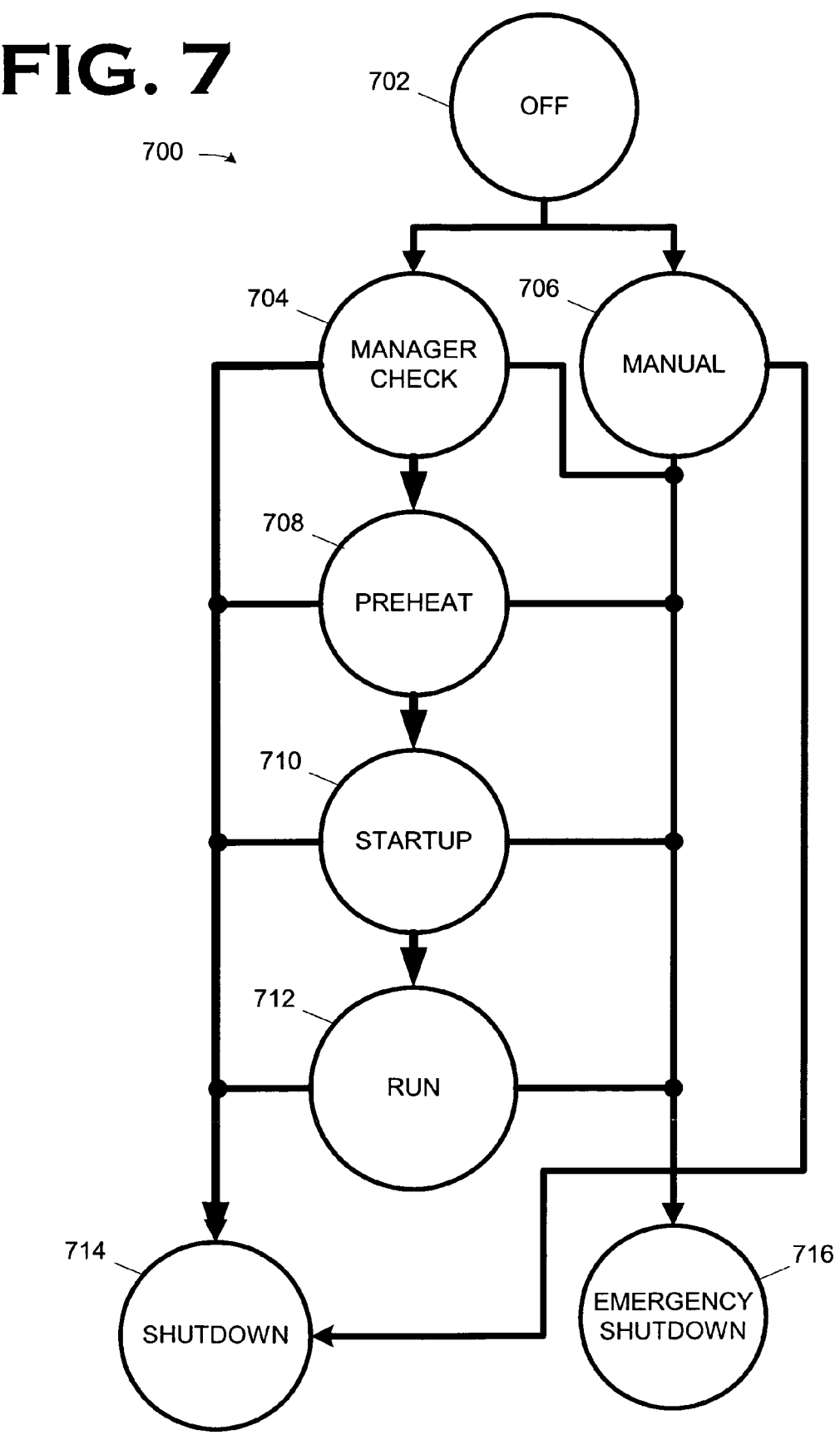

METHOD OF CONTROLLING A HYDROGEN GENERATOR

This is a continuation-in-part of U.S. application Ser. No. 10/407,488, entitled "Architectural Hierarchy of Control for a Fuel Processor," filed Apr. 4, 2003, now U.S. Pat. No. 7,318,970, in the name of the inventors Vesna R. Mirkovic et al., and commonly assigned herewith.

BACKGROUND OF THE INVENTION

1. Field of the Invention

The present invention is directed to a fuel processor, and, more particularly, to a control system for a fuel processor.

2. Description of the Related Art

Fuel cell technology is an alternative energy source for more conventional energy sources employing the combustion of fossil fuels. A fuel cell typically produces electricity, water 313, and heat from a fuel and oxygen. More particularly, fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of "fuel processors" or "reformers" to convert the hydrocarbons to a hydrogen rich gas stream which can be used as a feed for fuel cells. Hydrocarbon-based fuels, such as natural gas, LPG, gasoline, and diesel, require conversion for use as fuel for most fuel cells. Current art uses multi-step processes combining an initial conversion process with several clean-up processes. The initial process is most often steam reforming ("SR"), autothermal reforming ("ATR"), catalytic partial oxidation ("CPOX"), or non-catalytic partial oxidation ("POX"). The clean-up processes are usually comprised of a combination of desulfurization, high temperature water-gas shift, low temperature water-gas shift, selective CO oxidation, or selective CO methanation. Alternative processes include hydrogen selective membrane reactors and filters.

Thus, many types of fuels can be used, some of them hybrids with fossil fuels, but the ideal fuel is hydrogen. If the fuel is, for instance, hydrogen, then the combustion is very clean and, as a practical matter, only the water 313 is left after the dissipation and/or consumption of the heat and the consumption of the electricity. Most readily available fuels (e.g., natural gas, propane and gasoline) and even the less common ones (e.g., methanol and ethanol) include hydrogen in their molecular structure. Some fuel cell implementations therefore employ a "fuel processor" that processes a particular fuel to produce a relatively pure hydrogen stream used to fuel the fuel cell.

Although fuel cells have been around for over a hundred years, the technology is still considered immature. The reasons for this state are many and difficult. Recent political, commercial, and environmental conditions have, however, spurred an increased interest in fuel cell technology. The increased interest has, in turn, generated a heightened pace of technological development.

However welcome the heightened pace of development may be, it presents problems of its own. Fuel cell designs, particularly those with fuel processors, are typically complex. Consider the fuel processor design illustrated in U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1). The anode tailgas oxidizer temperature in this design is a function of catalyst loading, air flow and its space velocity and oxygen to carbon ratio at given space velocities. The sheer number of factors, in itself, makes control of this temperature a difficult task. Furthermore, a change in fuel type—for example, from natural gas to hydrogen—dramatically affects all these variables. Thus, the difficult control problem is exacerbated as the fuel processor design changes.

The present invention is directed to resolving, or at least reducing, one or all of the problems mentioned above.

SUMMARY OF THE INVENTION

A method and apparatus for use in generating hydrogen are disclosed. In its various aspects and embodiments, the invention includes a hydrogen generator. The hydrogen generator comprises: a fuel processor capable of producing a reformate from a fuel; a hydrogen purifier capable of generating a purified hydrogen gas stream from the reformate; a compressor capable of providing the reformate from the fuel processor to the pressure swing adsorption unit at a desired pressure; and a control system capable of integrating and controlling the operation of the fuel processor, the pressure swing adsorption unit, and the compressor. In another aspect, the invention includes a method for controlling the operation of a purified hydrogen generator, the method comprising: controlling the operation of a hydrogen generator; controlling the operation of a hydrogen purifier; and synchronizing the controlled operation of the hydrogen generator with the controlled operation of the hydrogen purifier. In a third aspect, the invention includes a method for controlling the operation of a purified hydrogen generator comprising a hydrogen generator and a hydrogen purifier. This method comprises managing the operation of each of a plurality of physical subsystems of the purified hydrogen generator through a respective subsystem manager, the physical subsystems including at least one hydrogen generator subsystem and at least one hydrogen purifier subsystem; directing state transitions of the subsystem managers from a master control manager; and routing interaction between the subsystem managers from the master control manager, including interaction between the hydrogen generator subsystem and the hydrogen purifier subsystem. Still other aspects and embodiments are presented below.

BRIEF DESCRIPTION OF THE DRAWINGS

The invention may be understood by reference to the following description taken in conjunction with the accompanying drawings, in which like reference numerals identify like elements, and in which:

FIG. 7 is a state machine for the physical subsystems of one particular embodiment of the present invention.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present invention is generally directed to method and apparatus for controlling a "fuel processor," or "reformer," i.e., an apparatus for converting hydrocarbon fuel into a hydrogen rich gas. The term "fuel processor" shall be used herein. In the embodiment illustrated herein, the method and apparatus control a compact processor for producing a hydrogen rich gas stream from a hydrocarbon fuel for use in fuel cells. However, other fuel processors may be used in alternative embodiments. Furthermore, other possible uses are contemplated for the apparatus and method described herein, including any use wherein a is hydrogen rich stream is desired. The method and apparatus may also be used in embodiments not applicable to the production of gas streams. Accordingly, while the invention is described herein as being used in conjunction with a fuel cell, the scope of the invention is not limited to such use.

Figure 1:
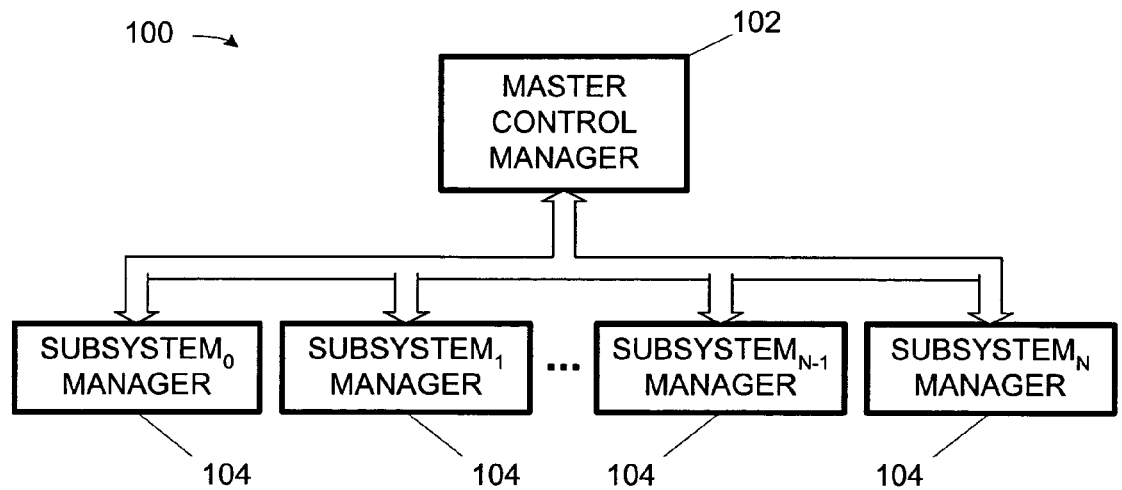
FIG. 1 illustrates one particular embodiment of a control system implemented in accordance with the present invention.

FIG. 1 illustrates one particular embodiment of a control system 100 designed, built, and operated in accordance with the present invention. The control system 100 comprises a master control manager 102, and a plurality of physical subsystem managers 104. The number of subsystem managers 104 is not material to the invention. Accordingly, FIG. 1 illustrates N subsystem managers 104, designated SUBSYSTEM MANAGER$_0$-SUBSYSTEM MANAGER$_N$. In theory, the number N may be any number, although those skilled in the art having the benefit of this disclosure will appreciate that certain practical limitations will arise from implementation specific details. Nevertheless, the number N of subsystem managers 104 is not material to the practice of the invention.

Figure 2A:
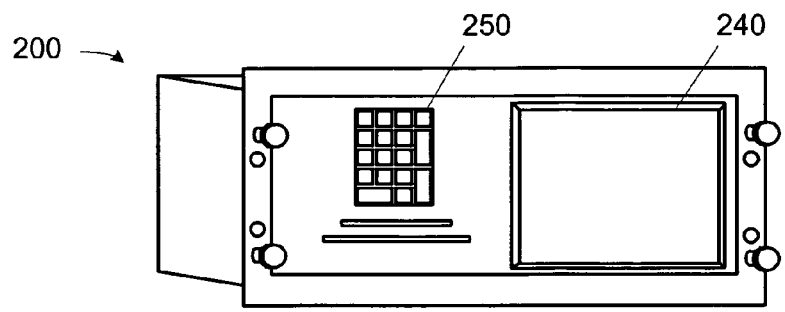
FIG. 2A and FIG. 2B conceptually illustrate a computing apparatus as may be used in the implementation of the embodiment of FIG. 1.
Figure 2B:
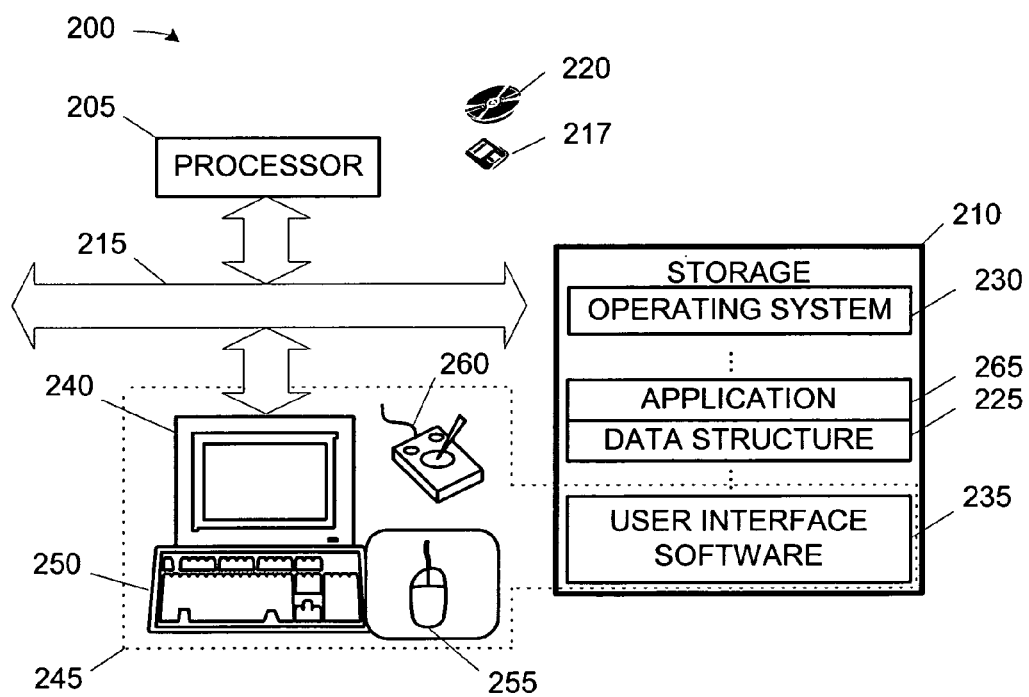

The control system 100 is largely software implemented on a computing apparatus, such as the rack-mounted computing apparatus 200 is illustrated in FIG. 2A and FIG. 2B. Note that the computing apparatus 200 need not be rack-mounted in all embodiments. Indeed, this aspect of any given implementation is not material to the practice of the invention. The computing apparatus 200 may be implemented as a desktop personal computer, a workstation, a notebook or laptop computer, or even an embedded processor.

The computing apparatus 200 illustrated in FIG. 2A and FIG. 2B includes a processor 205 communicating with storage 210 over a bus system 215. The storage 210 may include a hard disk and/or random access memory ("RAM") and/or removable storage such as a floppy magnetic disk 217 and an optical disk 220. The storage 210 is encoded with a data structure 225 storing the data set acquired as discussed above, an operating system 230, user interface software 235, and an application 265. The user interface software 235, in conjunction with a display 240, implements a user interface 245. The user interface 245 may include peripheral I/O devices such as a key pad or keyboard 250, a mouse 255, or a joystick 260. The processor 205 runs under the control of the operating system 230, which may be practically any operating system known to the art. The application 265 is invoked by the operating system 230 upon power up, reset, or both, depending on the implementation of the operating system 230. In the illustrated embodiment, the application 265 includes the control system 100 illustrated in FIG. 1.

Thus, at least some aspects of the present invention will typically be implemented as software on an appropriately programmed computing device, e.g., the computing apparatus 200 in FIG. 2A and FIG. 2B. The instructions may be encoded on, for example, the storage 210, the floppy disk 217, and/or the optical disk 220. The present invention therefore includes, in one aspect, a computing apparatus programmed to perform the method of the invention. In another aspect, the invention includes a program storage device encoded with instructions that, when executed by a computing apparatus, perform the method of the invention.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Figure 3:
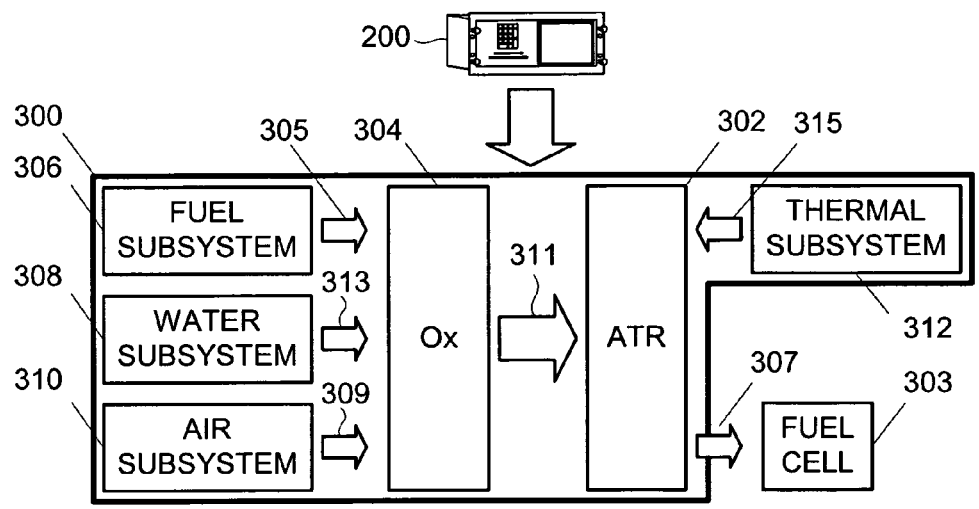
FIG. 3 illustrates one particular embodiment of a fuel processor controlled in accordance with the present invention.

The control system 100 controls, in the illustrated embodiment, a fuel processor, i.e., the fuel processor 300 in FIG. 3. The fuel processor 300 comprises several modular physical subsystems, namely:

- an autothermal reformer ("ATR") 302 that performs a partial oxidation and optionally a steam reforming reaction to reform the fuel 302 into the reformate 302;
- an oxidizer ("Ox") 304, which is an anode tailgas oxidizer ("ATO") in the illustrated embodiment, that preheats water 313, fuel 305, and air 309 for delivering a heated fuel mixture, or "process feed stream", 311 to the ATR 302;
- a fuel subsystem 306, that delivers an input fuel 305 to the oxidizer 304 for preheating and inclusion in the process feed stream 311 delivered to the ATR 302;
- a water subsystem 308, that delivers the water 313 to the oxidizer 304 for conversion to steam and inclusion in the process feed stream 311 delivered to the ATR 302;
- an air subsystem 310, that delivers air 309 to the oxidizer 304 for mixing into the process feed stream 311 delivered to the ATR 302; and
- a thermal subsystem 312, that controls temperatures in the operation of the ATR 302 by circulating a coolant 315 (e.g., water 313) therethrough.

Particular implementations of the ATR 302, oxidizer 304, fuel subsystem 306, water subsystem 308, air subsystem 310, and thermal subsystem 312 are illustrated in FIG. 4A-FIG. 4F.

Figure 4A:
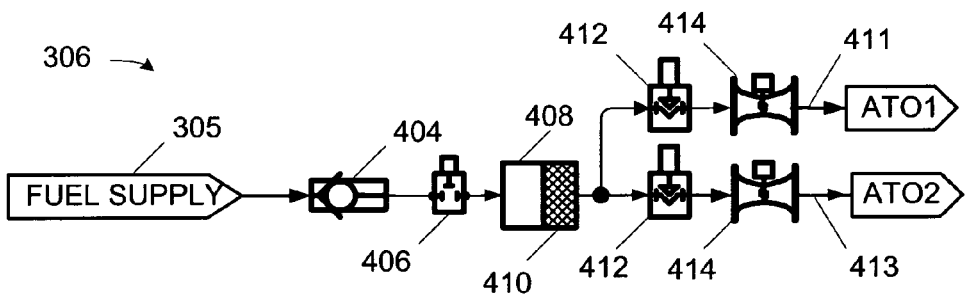
FIG. 4A-FIG. 4F detail the physical subsystems of the fuel processor in FIG. 3.

FIG. 4A depicts one particular implementation of the fuel subsystem 306. The fuel subsystem 306 includes a fuel supply 402 and provides feeds ATO1, ATO2 to two different parts of the oxidizer 304. As previously mentioned, the fuel 305 in the illustrated embodiment is natural gas, but may be some other type of hydrocarbon. The hydrocarbon fuel may be liquid or gas at ambient conditions as long as it can be vaporized. As used herein the term "hydrocarbon" includes organic compounds having C—H bonds which are capable of producing hydrogen from a partial oxidation or steam reforming reaction. The presence of atoms other than carbon and hydrogen in the molecular structure of the compound is not excluded. Thus, suitable fuels for use in the method and apparatus disclosed herein include, but are not limited to hydrocarbon fuels such as natural gas, methane, ethane, propane, butane, naphtha, gasoline, and diesel fuel, and alcohols such as methanol, ethanol, propanol, and the like. A Sulphur trap 408 receives the fuel 305 from the fuel supply 402 though a check valve 404 and a solenoid valve 406. The de-sulphured fuel is then filtered by the filter 410 and fed through two lines 411, 413 each including a control valve 412 and a flow meter 414, to the oxidizer 304.

Figure 4B:
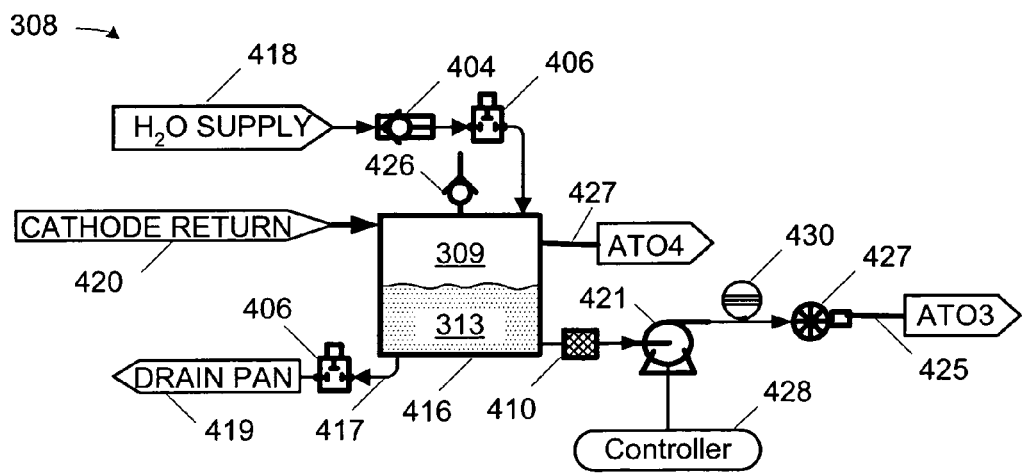

FIG. 4B depicts one particular implementation of the water subsystem 308. A tank 416 receives water 313 from a water supply 418 through a check valve 404 and a solenoid valve 406. In the illustrated embodiment, the tank 416 also receives water 313 through a return 420 from the cathode (not shown) of the fuel cell 303. Pressure and volume in the tank 416 are also controlled through a pressure relief, check valve 426 and a drain 417 through a solenoid valve 406 to a drain pan 419. Water 424 in the tank 416 is pumped by the pump 421 through the line 425, including the filter 410 and the mass flow meter 427, to the oxidizer 304 under the direction of the controller 428. A damper 430 damps oscillations or fluctuations in the pressure of the pumped water 424 on its way to the oxidizer 304. The air 309 is also fed to the oxidizer 304 via the line 427.

Figure 4C:
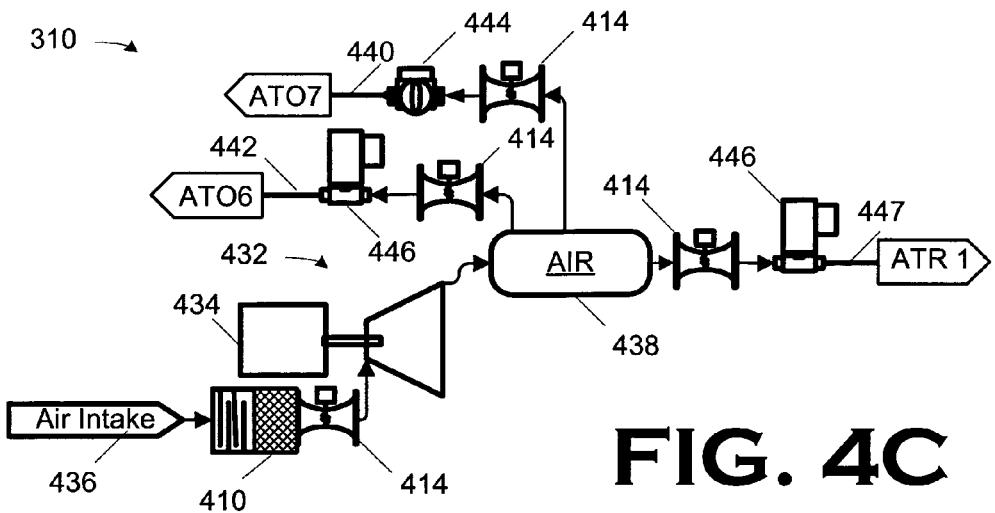

FIG. 4C depicts one particular implementation of the air subsystem 310. A compressor 432, including a motor 434, receives filtered air 309 from the ambient atmosphere via an air intake 436, a filter 410, and a flow meter 414 and compresses it into a tank 438. The air 309 from the tank 438 is then distributed through two feeds ATO6, ATO7 over the lines 440, 442, including the flow meters 414 and control valves 444, 446, to the oxidizer 304. The air 309 from the tank 438 is also distributed through a feed ATR1 over the line 447 including a flow meter 414 and a control valve 446 to the ATR 302.

Figure 4D:
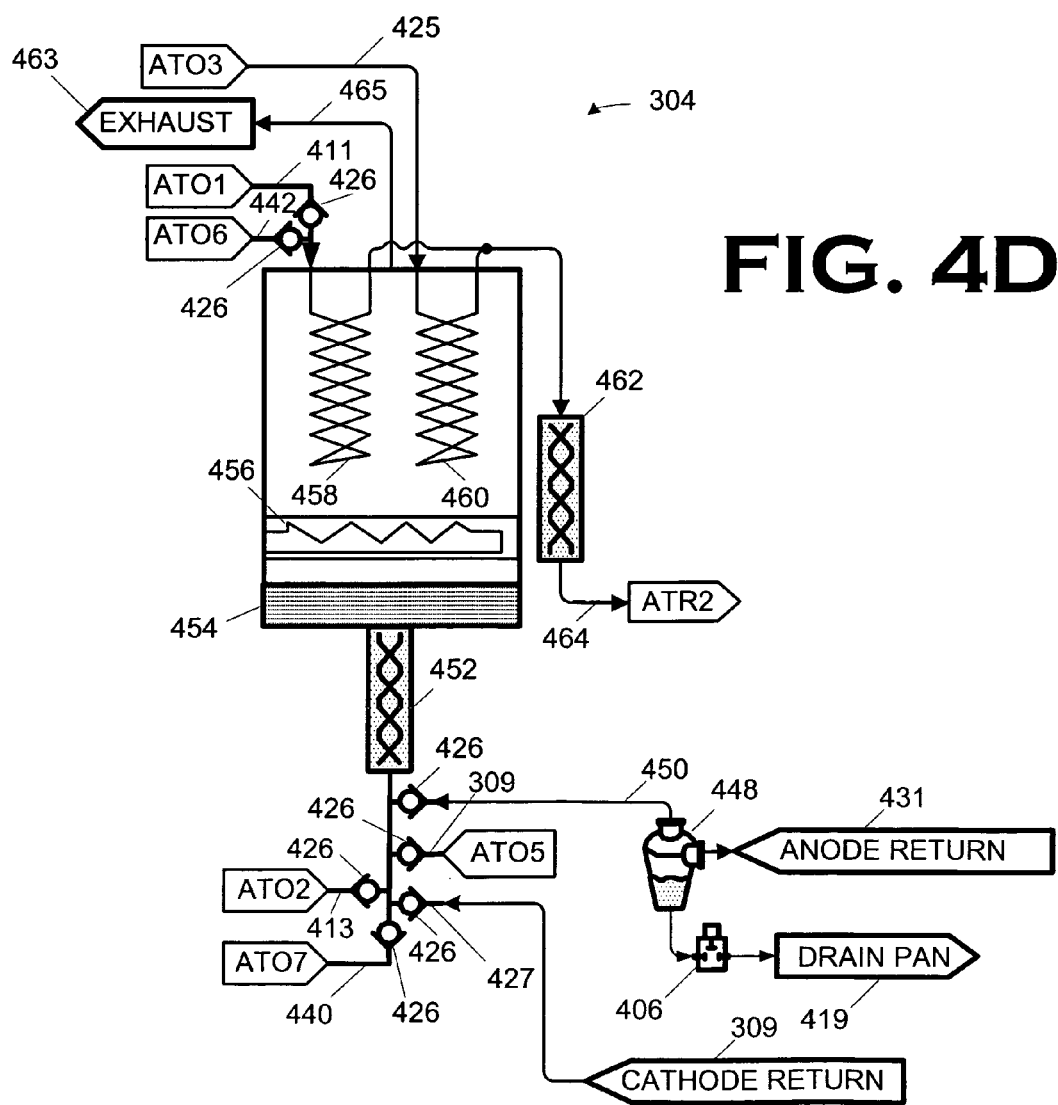

FIG. 4D depicts one particular implementation of the oxidizer 304. The oxidizer 304 receives fuel 305, water 313, and air 309 through the feeds ATO2, ATO3, ATO5, ATO7 via the lines 413, 440, 427, 429, described above, from the fuel subsystem 306, water subsystem 308, the air subsystem 310, and the ATR 302 through a plurality of check valves 426. The feed ATO5 is from a water separation system (discussed below) associated with the ATR 302. Hot air 309 from the cathode (not show) of the fuel cell 303 is also returned to the oxidizer 304. Exhaust 431 from the anode (not shown) of the fuel cell 303 is returned to a water separator 448, that separates out the water 313 that is drained via the solenoid valve 406 to the drain pan 419. The dehydrated anode return is then supplied to the oxidizer 304 via a check valve 426 through the line 450. The fuel 305, air 309, and dehydrated anode return are then mixed in the mixer 452, before introduction to the tank 454 of the oxidizer 304. The resultant mixture is then heated by the electric heater 456.

Still referring to FIG. 4D, the oxidizer 304 also receives fuel 305, air 309, and water 313 from the fuel subsystem 306, the water subsystem 308, and the air subsystem 310 through the feeds ATO1, ATO6, ATO3 over the lines 411, 442, and 425, respectively, described above. The lines 411 and 442 are protected by check valves 426. Air 309 and fuel 305 received over the lines 411, and 442 enter the enclosed coil 458. Water 313 received over the line 425 enters the enclosed coil 460. The heated air 309, water 313, and fuel mixture in the tank 454 heats the contents of the enclosed coils 458, 460, which are then mixed in the mixer 462 and provided to the ATR 302 through the feed ATR2 over the line 464. The oxidizer 304 is rented to an exhaust 463 through a line 465.

Figure 4E:
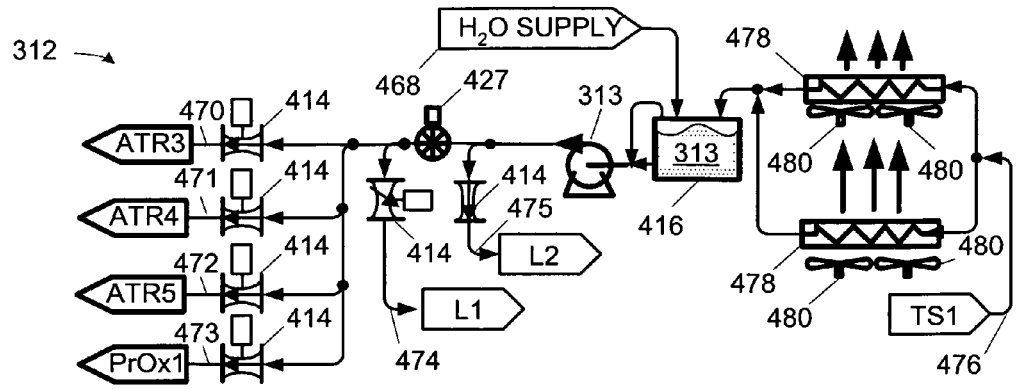

FIG. 4E depicts one particular implementation of the thermal subsystem 312. Water 466 is drawn from a water supply 468 into a tank 416. Note that the water supply 468 differs from the water supply 418 of the water subsystem 308, shown in FIG. 4B. The water 424 drawn from the water supply 418 is, in the illustrated embodiment, de-ionized, whereas the water 466 is not. The water 466 is circulated to various parts of the ATR 302 and subsystems associated with it through the feeds ATR3, PROX1, L1, L2 over the lines 471-475. Water 466 previously circulated to the ATR 302 is returned to the thermal subsystem 312 through the feed TS1 over the line 476. Heat introduced to the water 466 by the ATR 302 components is dumped to the environment through the heat exchangers 478. The illustrated embodiment also employs fans 480 to facilitate this heat exchange.

Figure 4F:
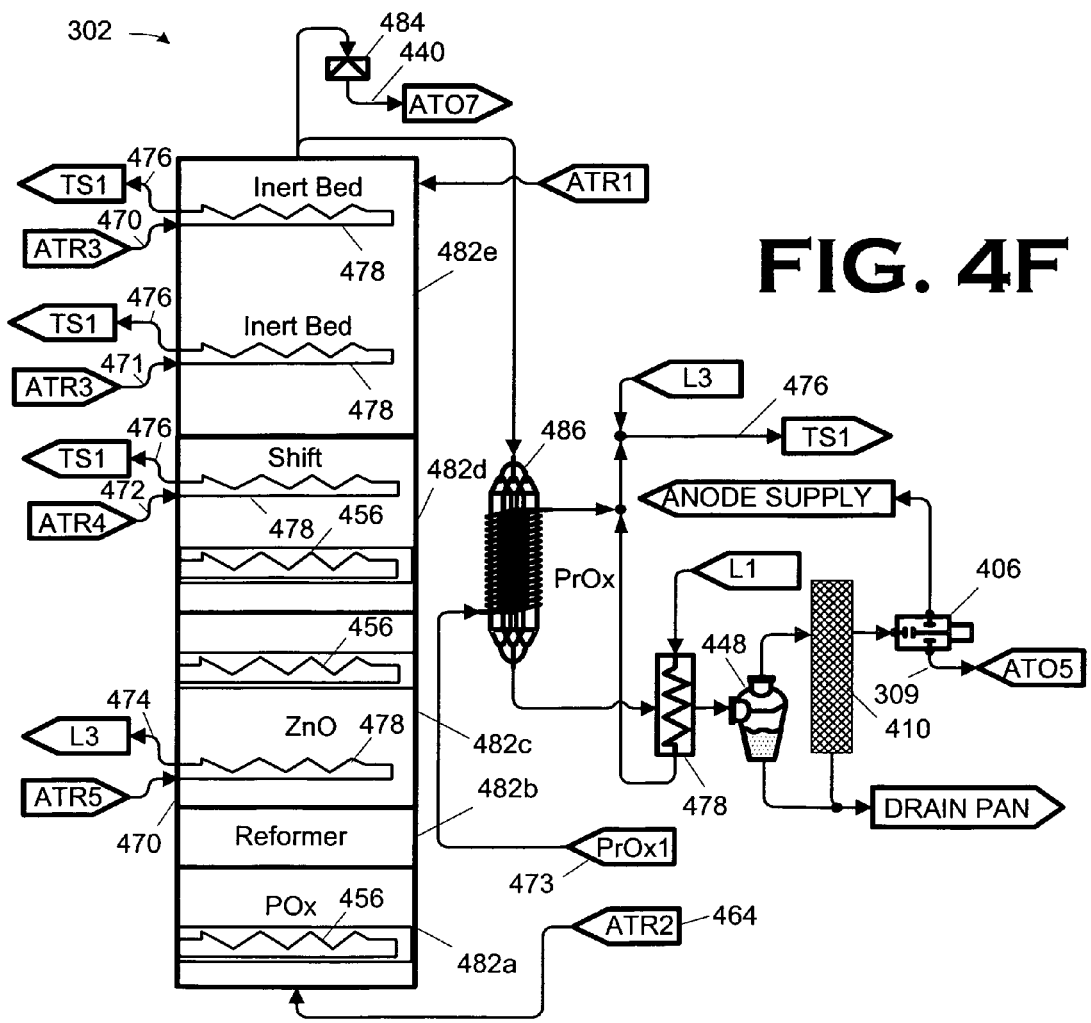

FIG. 4F depicts one particular implementation of the ATR 302. The ATR 302 comprises several stages 482a-482e, including numerous heat exchangers 478 and electric heaters 456. Each of the heat exchangers 478 receives temperature controlled water 466 from the thermal subsystem 312 (shown best in FIG. 4E) over the lines 470-472 and returns it over the lines 476. The exceptions are the heat exchangers 478 in the preferential oxidizing ("prox") stage 482, which receives the water 466 from the thermal subsystem 312 over the line 473 and returns it to a water tank 416 via line 476 and the feed TS1. The reformate gas 307 exiting the ATR 302 passes through a preferential oxidizer 486, is heated by the heat exchanger 478, dehydrated by the water separator 448, filtered, and supplied to the anode (not shown) of the fuel cell 303 (shown in FIG. 3). The illustrated embodiment also includes a burst disk 484 that, when the ATR 302 overpressures, bursts so that the content of the ATR 302 is dumped to the oxidizer 304 via the line 440 and the feed ATO7.

Figure 5:
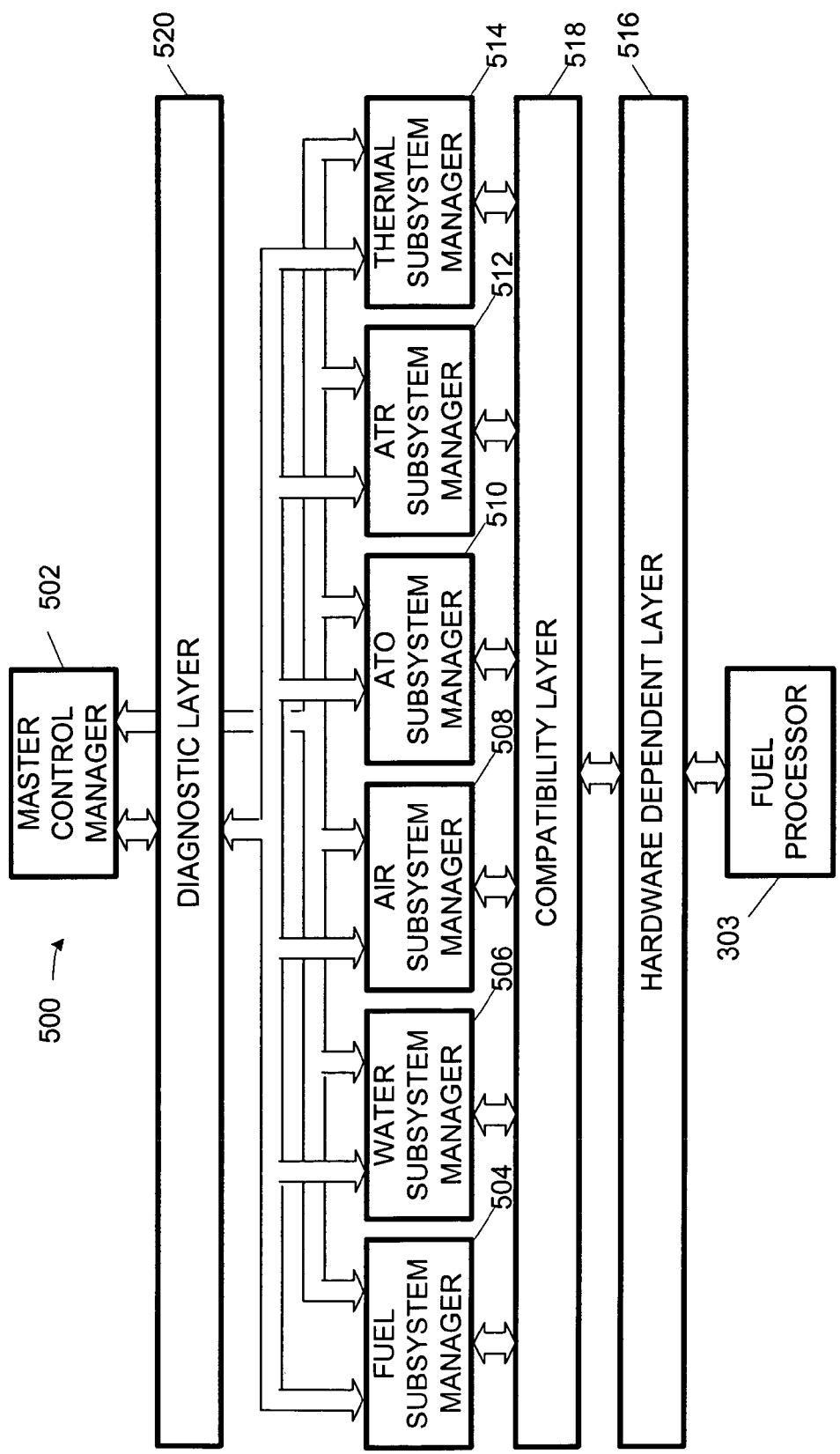
FIG. 5 depicts one particular embodiment of the control system of FIG. 1 for use in controlling the fuel processor first shown in FIG. 3.

Returning now to FIG. 3, each of the ATR 302, oxidizer 304, fuel subsystem 306, water subsystem 308, air subsystem 310, and thermal subsystem 312 constitutes a physical subsystem controlled by one of the subsystem managers 104. Thus, one particular implementation of the control system 100 for use with the particular fuel processor 300 in FIG. 3 is shown in FIG. 5 comprises:

- a master control manager 502 that manages the control of the fuel processor 300 through the subsystem managers:
- a fuel subsystem manager 504 that controls the delivery of fuel 305 to the ATO 306 for mixing into the process feed stream 311 delivered to the ATR 302;
- a water subsystem manager 506 that controls delivery of water 313 to the ATO 306 for mixing into the process feed stream 311 delivered to the ATR 302;
- an air subsystem manager 508 that controls delivery of air 309 to the ATO 306 for mixing into the process feed stream 311 delivered to the ATR 302;
- an ATO subsystem manager 510 that controls the mixing of steam, fuel 305, and air 309 to create a fuel mixture delivered as a process feed stream 311 to the ATR 302;
- an ATR subsystem manager 512 that controls the oxidation-reduction reaction in the ATR 302 that reforms the fuel 305 input to the fuel processor 300 into a reformate 307 for the fuel cell 303; and
- a thermal subsystem manager 514 controls temperatures in the operation of the ATR 302 through the thermal subsystem 312.

Thus, each of the subsystem managers 504-514 controls the operation of a respective physical subsystem 302, 304-312.

The control system 500 further includes additional layers that contribute to its modularity in a hierarchical fashion. More particularly, the control system 500 includes a hardware-dependent layer 516 and a "compatibility" layer 518. Aspects of the control functionality that are hardware-dependent are segregated into the hardware-dependent layer 516. For example, referring to FIG. 4A, to increase the flow of fuel 305 to the oxidizer 304, one or both of the control valves 414 is opened. A control signal (not shown) is transmitted from the control system 500 to the actuator (also not shown) of the control valve(s) 414, and the characteristics of this signal are hardware dependent. The functionality of actually generating and transmitting this control signal is segregated into the hardware-dependent layer 516. Thus, if the hardware in, for example, the fuel subsystem 306 is changed out from one model to another, then only the hardware-dependent layer 516 needs to be amended. The compatibility layer 518 converts instructions issued by the subsystem managers 504-514 so that they are compatible with the hardware of the fuel processor 300. For instance, one subsystem manager 504-514 may request an event using a particular unit of measurement. The hardware needed to implement the request may take instructions in a second unit of measurement. The compatibility layer 518 will translate the instruction issued by the subsystem managers 504-514 in the first unit of measurement to the second unit of measurement employed by the hardware so it can be implemented by the hardware-dependent layer 516.

The illustrated embodiment of the control system 500 furthermore includes a diagnostic layer 520 that also contributes to its modularity in a hierarchical fashion. Each of the subsystem managers 504-514 monitors its respective physical subsystem 302, 304-312 for error conditions. More particularly, the subsystem managers 504-514 monitor for "shutdown" conditions, i.e., error conditions sufficiently important they warrant shutting down the fuel processor 300. The error conditions detected by the subsystem managers 504-514 are reported to the master control manager 502 through the diagnostic layer 520.

Figure 6:
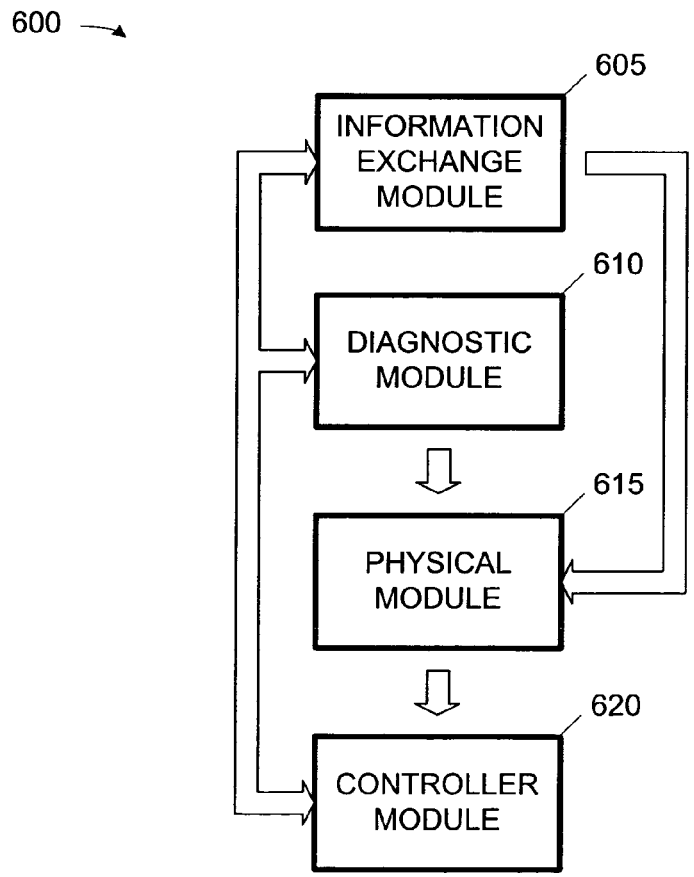
FIG. 6 illustrates an architectural hierarchy of a subsystem manager for the control system first shown in FIG. 5 in accordance with the present invention.

Each of the subsystem managers 504-514 also embodies a modular internal structure 600 conceptually illustrated in FIG. 6. Each of the subsystem managers 504-514 employs this modular internal structure 600 to conduct its business in the management of the respective physical subsystem 302, 304-312. Each of the subsystem managers 504-514 includes:

- an information exchange module 605 through which the particular subsystem manager 504-514 determines the feasibility of implementing events requested by other subsystem managers 504-514 through the master control manager 502 and identifies the actions for implementing requested events;
- a diagnostic module 610 that communicates with the diagnostic layer 520 through the information exchange module 605 to report error conditions;
- a physical module 615 with which the information exchange module 605 consults to identify the actions for implementing requested events and with which the diagnostic module communicates to obtain information regarding error conditions; and
- a control module 620 with which the physical module 615 consults to determine which actions are to be taken to implement a requested event and through which communicates with the hardware-dependent layer 516 through the compatibility layer 518 to obtain the information for such determination.

In alternative embodiments of the control system 500 omitting the diagnostic layer 520, the diagnostic module 610 may be omitted from the subsystem managers 504-514.

Returning to FIG. 5, in the illustrated embodiment, the subsystem managers 504-514 cooperate with each other by communicating requests from their information exchange modules 605 through the master control manager 502. For instance, consider a situation in which the oxidizer 304, first shown in FIG. 3, senses a drop in pressure in the feed from the fuel subsystem 306, also first shown in FIG. 3. The ATO subsystem manager 510 may request that the supply of fuel 305 increase. In the parlance of the illustrated embodiment, a fuel increase would be an "event." The ATO subsystem manager 510 issues the request through its information exchange module 605, shown in FIG. 6, which communicates the request to the master control manager 502. The master control manager 502 forwards the request to the appropriate physical subsystem manager—the fuel subsystem manager 504, in this case.

The fuel subsystem manager 504 receives the request via its own information exchange module 605, which checks to see if it is in the proper operational state (discussed further below) to implement the request. The fuel subsystem manager 504 then implements the requested event if it is permissible and feasible. The information exchange module 605 instructs the physical module 615 to implement the requested event. The information exchange module 605 queries the controller module 620 about which actions need to be taken. The information exchange module 605 then informs the physical module 615 of those actions that need to be taken. The physical module 615 then issues such an instruction to the hardware actuator (not shown) through the hardware dependent layer 516 via the compatibility layer 518.

The master control manager 502 also controls the operational state of the overall system 300 through the subsystem managers 504-514. Consider, for instance, the state diagram 700 in FIG. 7, which represents the operational states and the transition among them of the subsystem managers 504-514. Each of the subsystem managers 504-514 transitions through eight different states, although not all eight in every operational cycle:

- an "off" state 702;
- a "manager check" state 704, in which the subsystem managers 504-514 check the operational readiness of their respective physical subsystem 302-312;
- a "manual" state 706, in which an operator can direct operation of the overall system;
- "preheat" state 708, in which the heating elements and fluids of the overall system 300 are preheated, or pre-cooled, to their designated levels for normal operation;
- a "startup" state 710, in which the overall system 300 begins operation under start-up conditions;
- a "run" state 712, in which the overall system 300 operates under steady-state conditions;
- a "shutdown" state 714, in which the physical subsystems of the overall system shutdown their operation to a planned end of an operational cycle; and
- an "emergency shutdown" state 716, in which the physical subsystems are shut down in response to the occurrence and detection of an emergency condition in one or more of the physical subsystems.

Although each of the subsystem managers 504-514 transitions through the same eight states, the tasks assigned to each of the subsystem managers 504-514 will be unique in light of the requirements of their respective physical subsystem 302-312. For example, the tasks performed by the fuel subsystem manager 504 in the run state 712 will differ from the tasks of the ATR subsystem manager 512 in the run state, given the differences in the operation and function of the fuel subsystem 306 and the ATR 302, both shown in FIG. 3.

Returning to FIG. 7, coming out of the off state 702, the subsystem managers 504-514 may transition into either the manager check state 704 or the manual state 706. From the manual state 706, the subsystem managers 504-514 transition only to either the shutdown state 714 or the emergency shutdown state 716. From the manager check state 704, the system managers 504-514 may transition through the preheat state 708, startup state 710, and run state 712 in that order. The subsystem managers 504-514 can transition into either of the shutdown state 714 and the emergency shutdown state 716 from any of the other states.

Referring now to FIG. 5 and FIG. 7, an operator chooses whether to enter the manual state 706 on powering up or initializing the system, i.e., exiting the off state 702. If the operator does not choose the manual state 706, the master control manager 502 assumes control. In the manual state 706, the operator can choose a percentage of operational capacity and the system ramps up to the setpoints of the specified level, but still applies control logic. That is, the subsystem managers 504-514 still cooperate with one another through the master control manager 500 as described above.

Assuming now that the operator does not assume manual control, the master control manager 502 sends a signal to each of the subsystem managers 504-514 to transition to the manager check state 704. Each of the subsystem managers 504-514 transitions to the manager check state 704. Each of the subsystem managers 504-514 then performs its tasks associated with the manager check state 704. When the individual subsystem managers 504-514 have completed their tasks associated with the manager check state 704, they signal that fact to the master control manager 502. The master control manager 502 waits until all the subsystem managers 504-514 have signaled they are through, and the signals the subsystem managers 504-514 to transition to the preheat state 708.

This procedure is repeated as the subsystem managers 504-514 transition through the remaining states. Note that the subsystem managers 504-514 transition to the next state only when signaled to do so by the master control manager 502. Note also that the master control manager 502 only signals the subsystem managers 504-514 to transition when all of the subsystem managers 504-514 are ready to do so. Thus, the subsystem managers 504-514 transition through their states in a synchronized fashion under the direction of the master control manager 502.

Returning to FIG. 5, the master control manager 502 therefore controls the overall operation of the fuel processor 300 in two ways. First, communications between various subsystem managers are routed through the master control manager 502. Second, the master control manager 502 controls the operational states of the subsystem managers 504-514.

Referring now to FIG. 3 and FIG. 5, the operation of the fuel processor 300 under the control of the control system 500 will now be described. On power up or reset, the fuel processor 300 and the control system 500 transition from the off state 702, shown in FIG. 7, to either the manager check state 704 or the manual state 706, depending on operator input. Again assuming the operator does not assume manual control, the master control manager 502 signals the subsystem managers 504-514 to transition to the manager check state 704, in which the subsystem managers 504-514 check the operational readiness of their respective physical subsystem. Once each of the subsystem managers 504-514 signals the master control manager 502 that their respective physical subsystem has passed the manager check, the master controller 502 signals the subsystem managers 504-514 to transition to the preheat state 708, in which the heating elements and fluids of the respective physical subsystems are preheated, or pre-cooled, to their designated levels for normal operation.

Once all the subsystem managers 504-514 signal that their respective physical subsystem has completed it's preheat tasks, the master control manager 502 signals them to transition to the startup state 710, in which the overall system 300 begins operation under start-up conditions. As will be appreciated by those skilled in the art having the benefit of this disclosure, the fuel processor 300 cannot simply step into production. For instance, the oxidizer 304 cannot begin to mix process feed stream 311 until it has fuel 305, water 313, and air 309 to mix. Similarly, the ATR 302 cannot begin to reform the fuel 305 until it has received sufficient process feed stream 311 from the oxidizer 304. Thus, in the startup state 710, out-of-range pressures, volumes, etc. that do not trigger, shutdown error conditions are tolerated until the fuel processor 300 reaches steady state operations.

Once all the subsystem managers 504-514 signal that their respective physical subsystems have reached steady-state operational conditions, the master control manager 502 signals them to transition to the run state 712. In the run state 712, the overall system 300 operates under steady-state conditions. The overall function of the fuel processor 300 is to reform the fuel 305, shown in FIG. 4A, for use by the fuel cell 303. Thus, the operation of the fuel processor 300 centers around the operation of the ATR 302 and the delivery of fuel 305 (shown in FIG. 4A), air 309 (shown in FIG. 4C), and water 313 (shown in FIG. 4B) to the ATR 302 from the fuel subsystem 306, water subsystem 308, and air subsystem 310.

Figure 8:
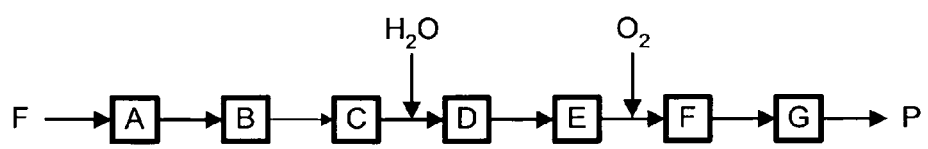
FIG. 8 graphically illustrates the reforming process of the autothermal reformer of the fuel processor first shown in FIG. 3.

FIG. 8 depicts a general process flow diagram illustrating the process steps included in the illustrative embodiments of the present invention. The following description associated with FIG. 8 is adapted from U.S. patent application Ser. No. 10/006,963, entitled "Compact Fuel Processor for Producing a Hydrogen Rich Gas," filed Dec. 5, 2001, in the name of the inventors Curtis L. Krause, et al., and published Jul. 18, 2002, (Publication No. US2002/0094310 A1). One of skill in the art should appreciate that a certain amount of progressive order is needed in the flow of the reactants trough the reactors disclosed herein. The fuel processor 300 feeds include a hydrocarbon fuel 305, oxygen, and water 313. The oxygen can be in the form of air 309, enriched air, or substantially pure oxygen. The water 313 can be introduced as a liquid or vapor. The composition percentages of the feed components are determined by the desired operating conditions, as discussed below. The fuel processor effluent stream from of the present invention includes hydrogen and carbon dioxide and can also include some water 313, unconverted hydrocarbons, carbon monoxide, impurities (e.g., hydrogen sulfide and ammonia) and inert components (e.g., nitrogen and argon, especially if air 309 was a component of the feed stream 311).

Process step A is an autothermal reforming process in which two reactions, a partial oxidation (formula I, below) and an optional steam reforming (formula II, below), performed in the modular 482a and 482b in FIG. 4F are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \qquad (I)$$

$$CH_4 + H_2O \rightarrow 3H_2 + CO \qquad (II)$$

The fuel stream F is received by the ATR 302 from the oxidizer 304 over the line 434, as shown in FIG. 4D and FIG. 4F. A higher concentration of oxygen in the feed stream 311 favors partial oxidation whereas a higher concentration of water 313 vapor favors steam reforming. The ratios of oxygen to hydrocarbon and water 313 to hydrocarbon are therefore characterizing parameters that affect the operating temperature and hydrogen yield.

The operating temperature of the autothermal reforming step A can range from about 550° C. to about 900° C., depending on the feed conditions and the catalyst. The ratios, temperatures, and feed conditions are all examples of parameters controlled by the control system of the present invention. The illustrated embodiment uses a catalyst bed of a partial oxidation catalyst in module 482a with or without a steam reforming catalyst.

Returning to FIG. 8, process step B is a cooling step performed in the module 482c of FIG. 4F for cooling the synthesis gas stream from process step A to a temperature of from about 200° C. to about 600° C., preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream using any suitable type of coolant 315. The illustrated embodiment uses water 466 received from the water 466 over the line 470 as shown in FIG. 4E and FIG. 4F.

Returning again to FIG. 8, process step C is a purifying step, performed in the module 482c, and employs zinc oxide as a hydrogen sulfide absorbent. One of the main impurities of the hydrocarbon stream is sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet, etc.). Desulfirization is accomplished by converting the hydrogen sulfide to water in accordance with the following reaction formula III:

$$H_2S + ZnO \rightarrow H_2O + ZnS \qquad (III)$$

The reaction is preferably carried out at a temperature of from about 300° C. to about 500° C., and more preferably from about 375° C. to about 425° C. This temperature is also controlled by the control system of the present invention.

Referring once more to FIG. 8, the effluent stream may then be sent to a mixing step D performed in module 482d, in which water 313 received from the water subsystem 308 is optionally added to the gas stream. The addition of water 313 lowers the temperature of the reactant stream as it vaporizes and supplies more water 313 for the water gas shift reaction of process step E (discussed below). The water vapor and other effluent stream components are mixed by being passed through a processing core of inert materials such as ceramic beads or other similar materials that effectively mix and/or assist in the vaporization of the water 313. Alternatively, any additional water 313 can be introduced with feed, and the mixing step can be repositioned to provide better mixing of the oxidant gas in the CO oxidation step G (discussed below). This temperature is also controlled by the control system of the present invention.

Returning to FIG. 8, process step E, performed in Module 482e is a water gas shift reaction that converts carbon monoxide to carbon dioxide in accordance with formula IV:

$$H_2O + CO \rightarrow H_2 + CO_2 \qquad (IV)$$

The concentration of carbon monoxide in the final reformate should preferably be lowered to a level that can be tolerated by fuel cells, typically below 50 ppm. Generally, the water gas shift reaction can take place at temperatures of from 150° C. to 600° C. depending on the catalyst used. Under such conditions, much of the carbon monoxide in the gas stream is converted. This temperature and concentration are more parameters controlled by the control system of the present invention.

Returning again to FIG. 8, process step F, performed in Module 482e, is a cooling step performed in the illustrated embodiment by a heat exchanger 478. The heat exchanger 478 reduces the temperature of the gas stream to produce an effluent having a temperature preferably in the range of from about 90° C. to about 150° C. Oxygen from the air subsystem 310 is also added to the process in step F over the line 498, as shown in FIG. 4C and FIG. 4F. The oxygen is consumed by the reactions of process step G described below.

Process step G, performed in module 482g, is an oxidation step wherein almost all of the remaining carbon monoxide in the effluent stream is converted to carbon dioxide. The processing is carried out in the presence of a catalyst for the oxidation of carbon monoxide. Two reactions occur in process step G: the desired oxidation of carbon monoxide (formula V) and the undesired oxidation of hydrogen (formula VI) as follows:

  (V)

  (VI)

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G reduces the carbon monoxide level to preferably less than 50 ppm, which is a suitable level for use in fuel cells.

The effluent exiting the fuel processor 303 is a hydrogen rich gas containing carbon dioxide and other constituents which may be present such as water 313, inert components (e.g., nitrogen, argon), residual hydrocarbon, etc. Product gas may be used as the feed for a fuel cell or for other applications where a hydrogen rich feed stream 311 is desired. Optionally, product gas may be sent on to further processing, for example, to remove the carbon dioxide, water 313 or other components.

Eventually, the operational cycle ends. If the end is planned, then the master control manager 502 signals the subsystem managers 504-514 to transition to the shutdown state 714 at an appropriate time. As mentioned above, the subsystem managers 504-514 monitor, through their diagnostic module 610, shown in FIG. 6, their respective physical subsystems for the occurrence of error conditions. Some error conditions warrant shutting down operation of the fuel processor 300. If such a "shutdown" error condition is detected, the subsystem manager 504-514 detecting it reports it through the diagnostic module 610 and the diagnostic layer 520, shown in FIG. 5, to the master control manager 502. The master control module 502 then signals the subsystem managers 504-514 to transition to the emergency shutdown state 716.

The modular design resulting from the hierarchical nature of the present invention permits flexibility in expansion of the control system. Whole subsystems can be removed, added, and/or replaced for testing, evaluating, and modifying subsystem designs without having to make major adjustments to the control system. None of the control algorithms are hardware-dependent, except for the hardware dependent layer, which contains instrument calibration data. Thus, various types of instruments can be added, removed, or replaced without affecting the control system as a whole, and without requiring a lot of reprogramming. The present invention therefore allows rapid and easy expansion of the process control system and facilitates seamless plug-ins of new subsystems. It also permits independent or different teams of developers to quickly create the control software for various physical subsystems from a relatively simple specification. This asset is particularly useful in rapidly evolving technologies, such as fuel processor/fuel cell design, with complex control systems.

Figure 9:
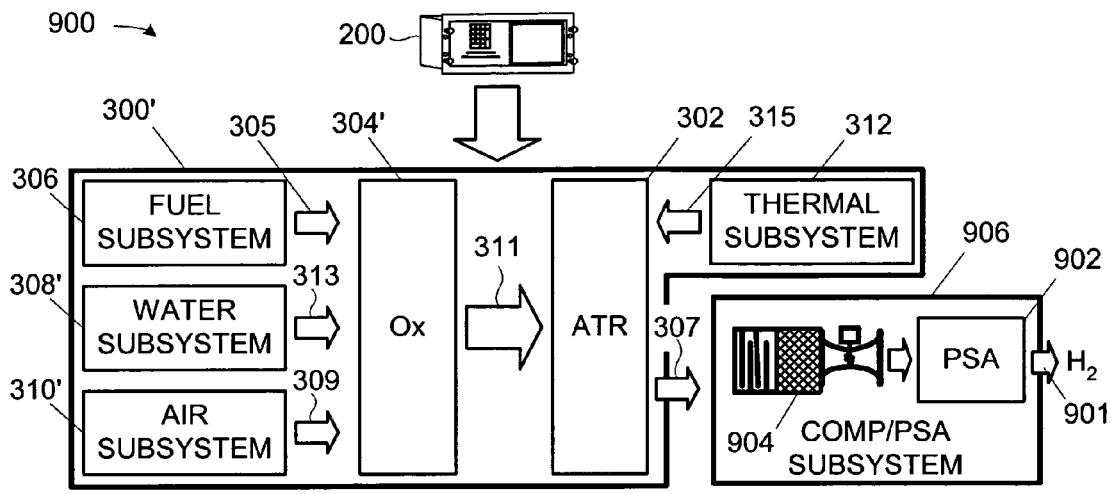
FIG. 9 depicts a pure hydrogen generator ("PHG") in accordance with one aspect of the present invention.

For instance, consider the hydrogen generator 900 illustrated in FIG. 9. The hydrogen generator 900 of FIG. 9 is a pure hydrogen generator ("PHG"). Note that the term "pure" does not necessarily mean 100% pure hydrogen. Rather, the $H_2$ output 901 may instead contain some acceptable, minimal degree of impurities. The acceptable degree of impurities will be implementation specific.

The hydrogen generator 900 may employ the fuel processor 300 first shown in FIG. 3 and discussed above, but employs a variant design 300' discussed more fully below. However, there is considerable similarity between the fuel processor 300 of FIG. 3 and the fuel processor 300' of FIG. 9, with like parts having like numbers. The fuel processor 300' in FIG. 9 and the fuel processor 300 in FIG. 3 each represent but one means for generating hydrogen acceptable for use in accordance with the present invention. Note that the fuel processor technology of the illustrated embodiments is but one technology by which a hydrogen-enriched gas stream (e.g., the reformate 307) may be produced. Alternative technologies for generating hydrogen, including hydrogen-enriched gas streams, are known. Alternative embodiments may include hydrogen generators employing these alternative technologies. Thus, alternative embodiments may employ means for generating hydrogen alternative to those shown.

Figure 10:
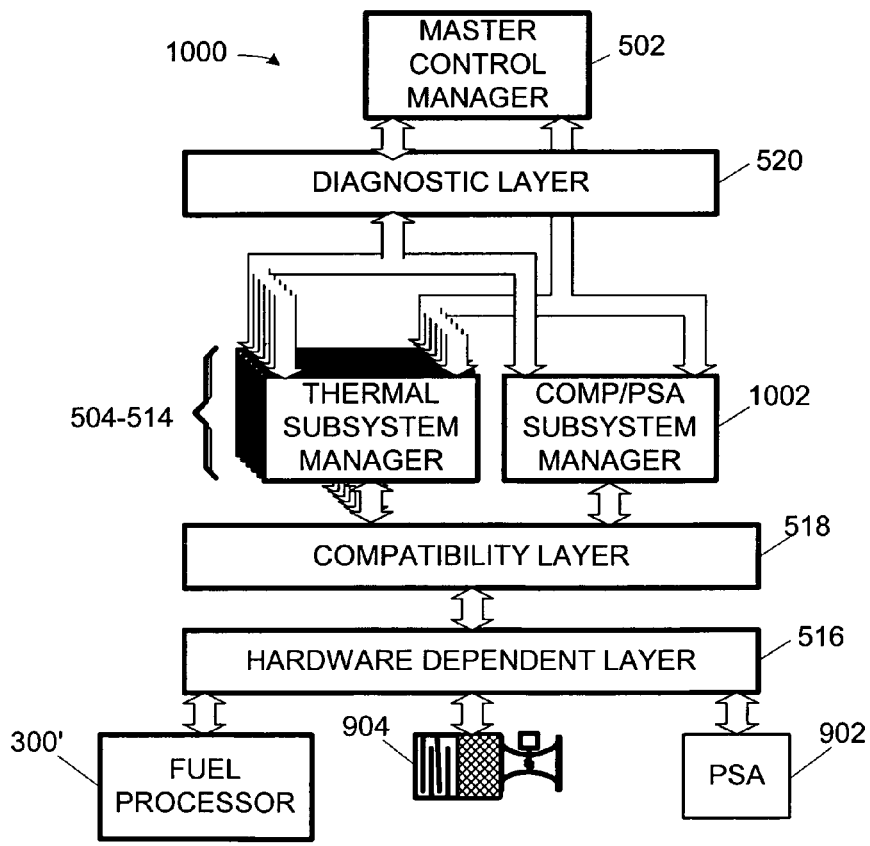
FIG. 10 depicts one particular embodiment of the control system of FIG. 1 for use in controlling the apparatus shown in FIG. 9.

In FIG. 9, the reformate 307 is output to a pressure swing adsorption ("PSA") unit 902 through a compressor 904. The compressor 904 delivers the reformate 307 from the fuel processor 300' to the PSA unit 902 at a controlled pressure. The PSA unit 902 is but one example of a means for purifying the hydrogen, or hydrogen-enriched gas stream (e.g., the reformate 307). Other purifying technologies are known, and may be acceptable for use in accordance with the present invention. Alternative embodiments may include hydrogen purifiers employing these alternative technologies. Thus, alternative embodiments may employ means for purifying hydrogen alternative to those shown FIG. 10 depicts one particular embodiment 1000 of the control system of FIG. 1 for use in controlling the hydrogen generator 900 shown in FIG. 9. More particularly, the control system 1000 is an extension of the control system 500, shown in FIG. 5. The embodiment illustrated in FIG. 9-FIG. 10 amply demonstrates the flexibility and desirability of this aspect of the invention in two different aspects. First, the present invention facilitates the extension of, e.g., the control system 500 to accommodate the addition of new equipment, e.g., the compressor 904 and PSA unit 902. Second, the present invention facilitates modifications to, e.g., the control system 500 to accommodate changes in hardware with minimal disturbance of the control logic.

More particularly, in the illustrated embodiment, the compressor 904 and the PSA unit 902 are controlled as a single compressor/PSA subsystem 906, shown in FIG. 9. The control system 1000 therefore includes a compressor/PSA subsystem manager 1002. Note that the addition of the new equipment, i.e., the compressor 904 and PSA unit 902, does not affect the control system 1000 with respect to the other physical subsystems. The control logic of the master control manager 502 with respect to the other subsystem managers 504-514 and of the other subsystem managers 504-514 remains unchanged.

The compressor/PSA subsystem manager 1002 communicates with the master control manager 502, the other subsystem managers 504-514, and the fuel processor 300' in the same manner and using the same mechanisms as the other subsystem managers 504-514. The compressor/PSA subsystem manager 1002 also communicates with the PSA 902 and the compressor 904 in the same manner that the other subsystem managers 504-514 communicate with the fuel processor 300', i.e., through the compatibility layer 518 and the hardware dependent layer 516. Like the other subsystem managers 504-514, the compressor/PSA subsystem manager 1002 is subordinate to the master control manager 502. Thus, the hydrogen generator 900 is a tightly integrated system of not only the fuel processor 300', but also the PSA 902 and the compressor 904.

Figure 11A:
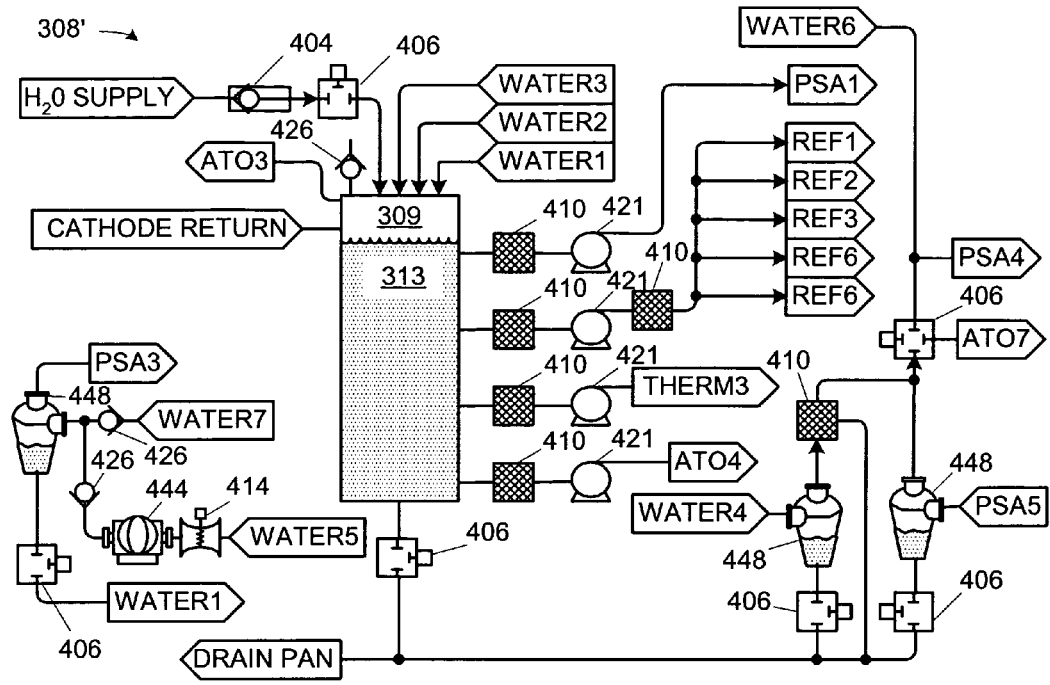
FIG. 11A-FIG. 11E detail the physical subsystems of the fuel processor of the PHG in FIG. 9.
Figure 11B:
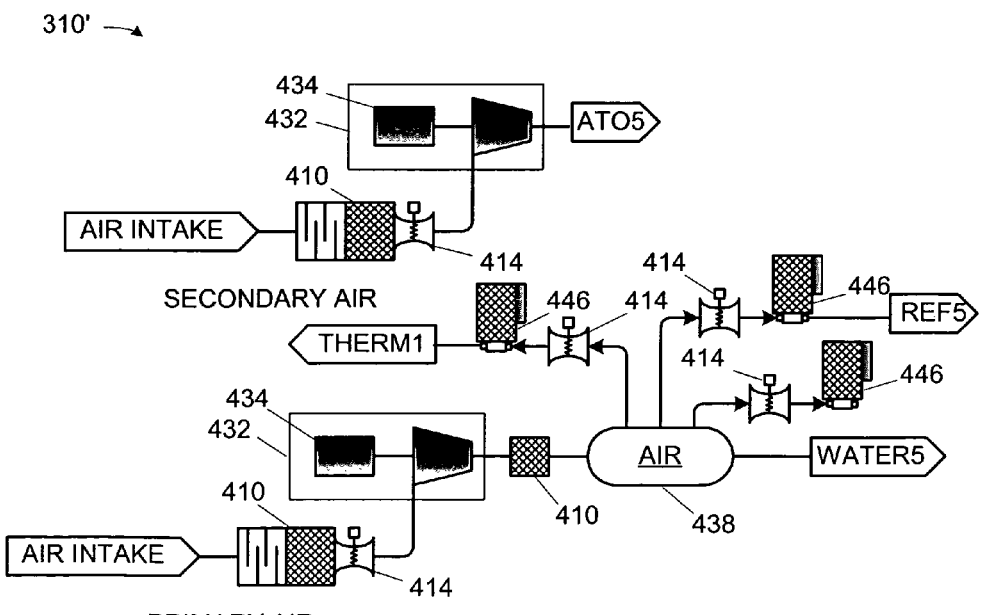
Figure 11C:
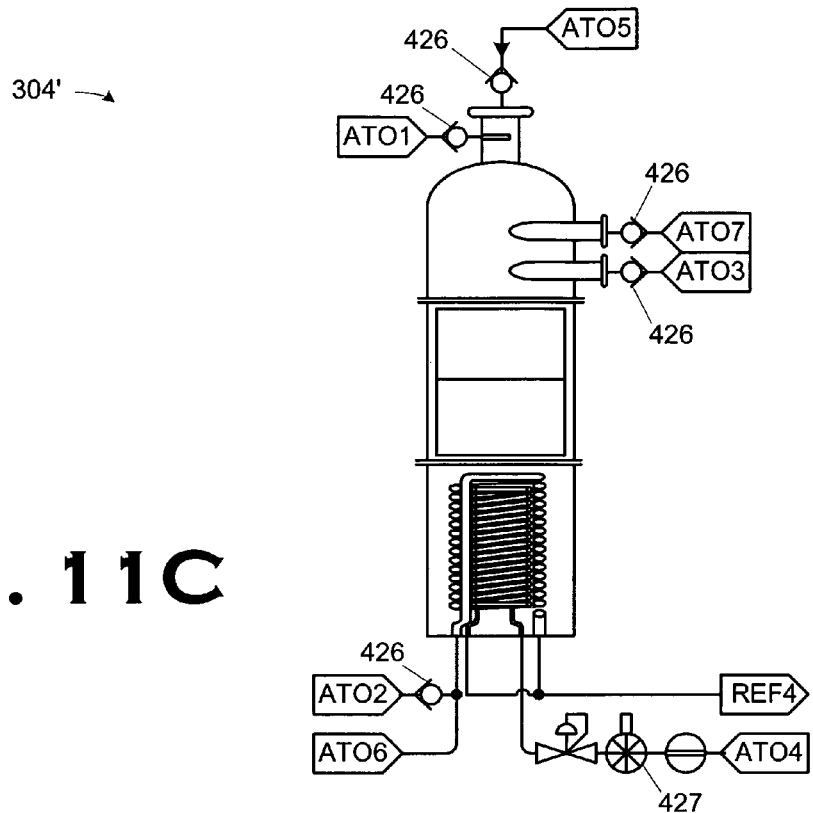
Figure 11D:
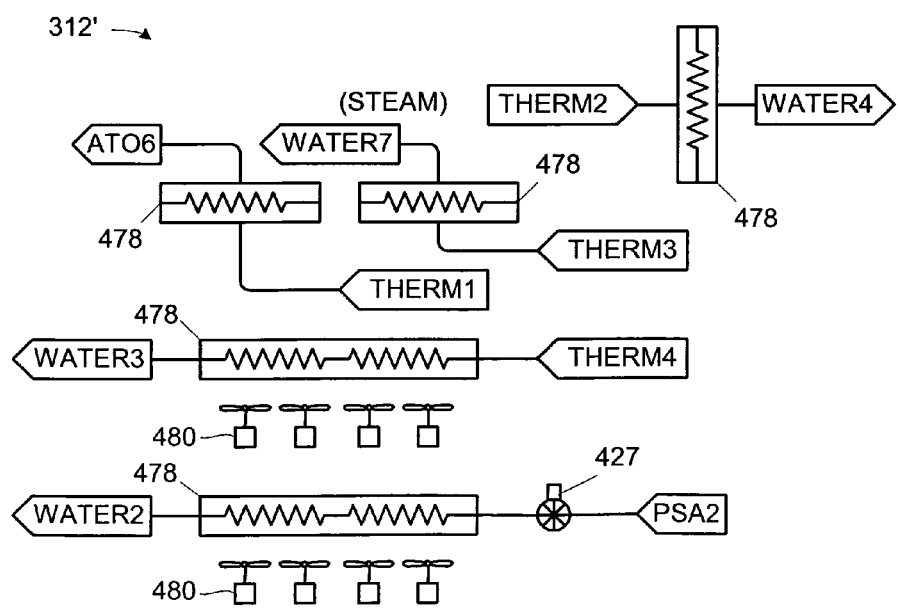
Figure 11E:
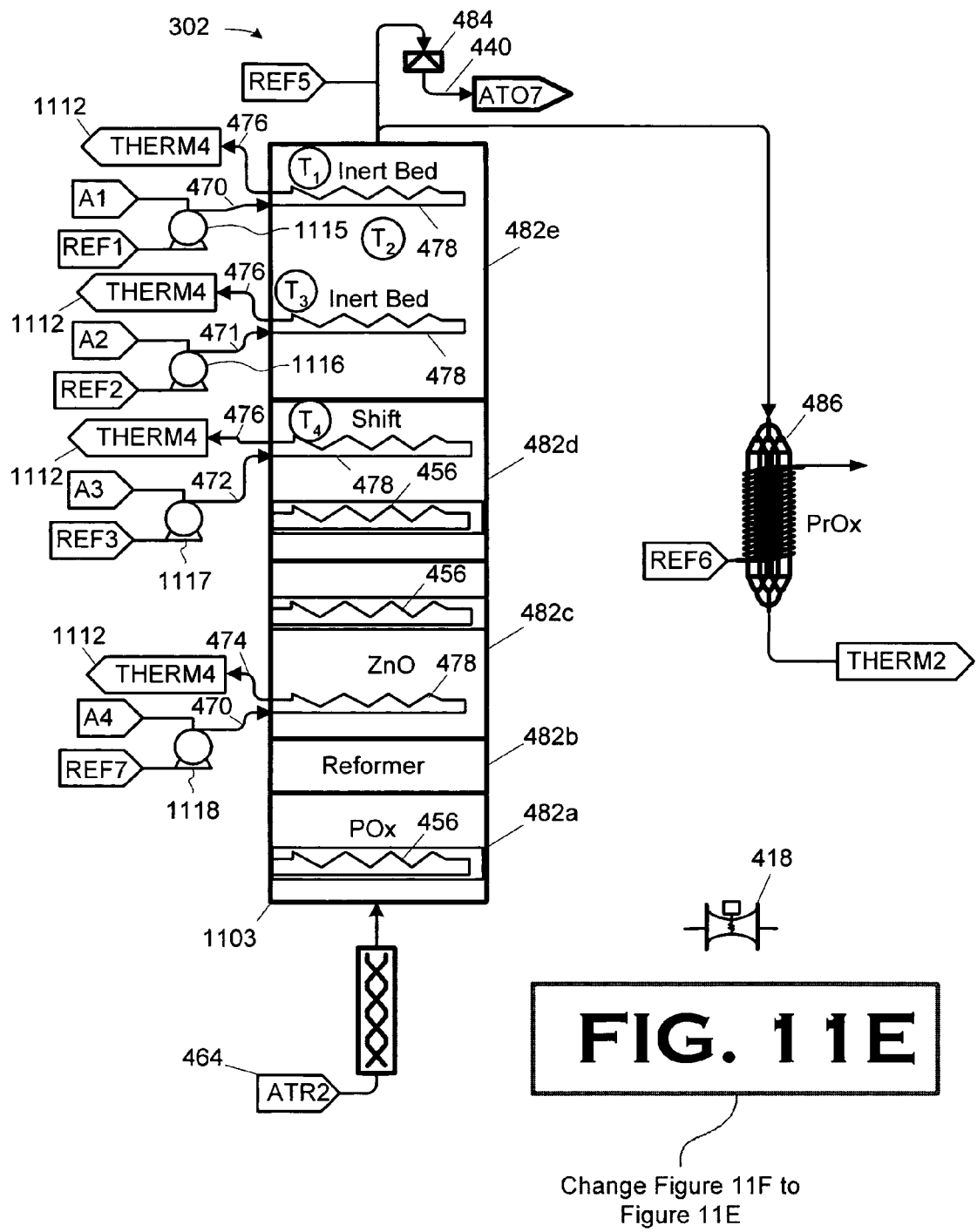
Figure 12A:
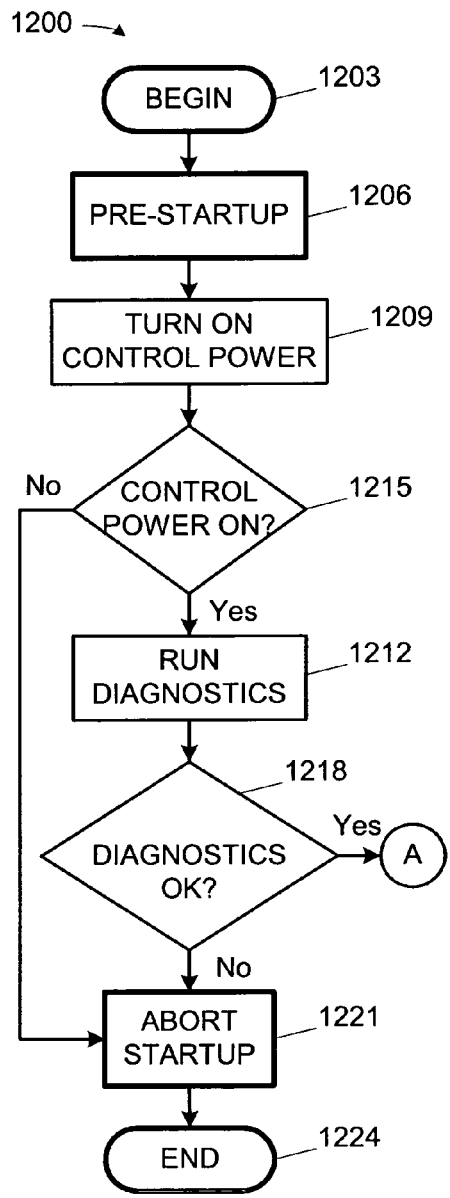
FIG. 12A-FIG. 12D illustrate a startup procedure for the apparatus of FIG. 9.
Figure 12B:
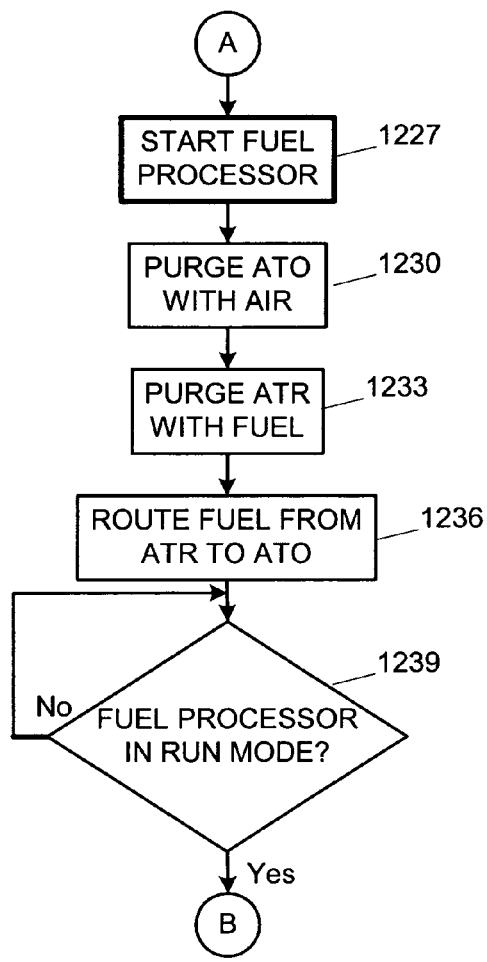
Figure 12C:
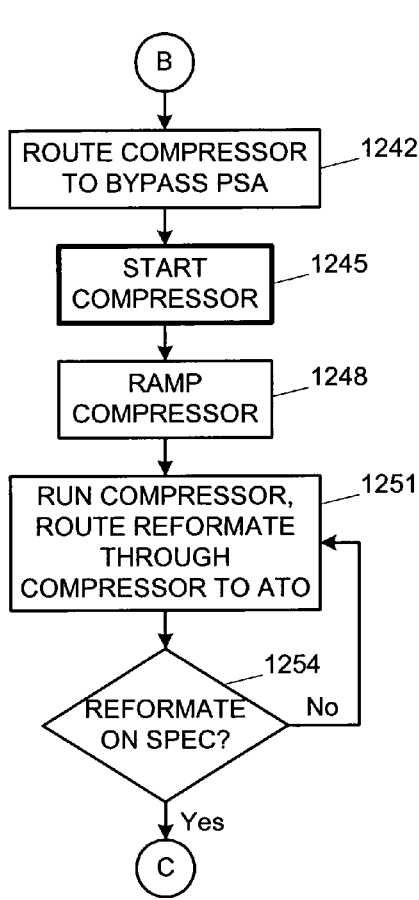
Figure 12D:
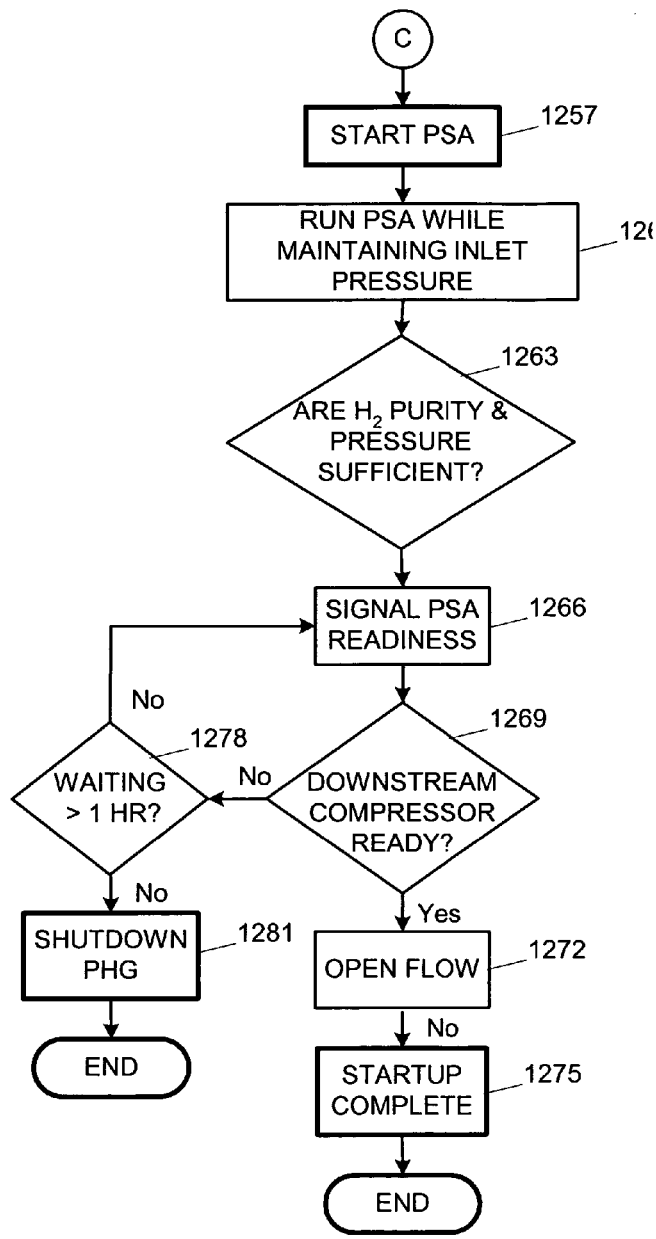
Figure 14:
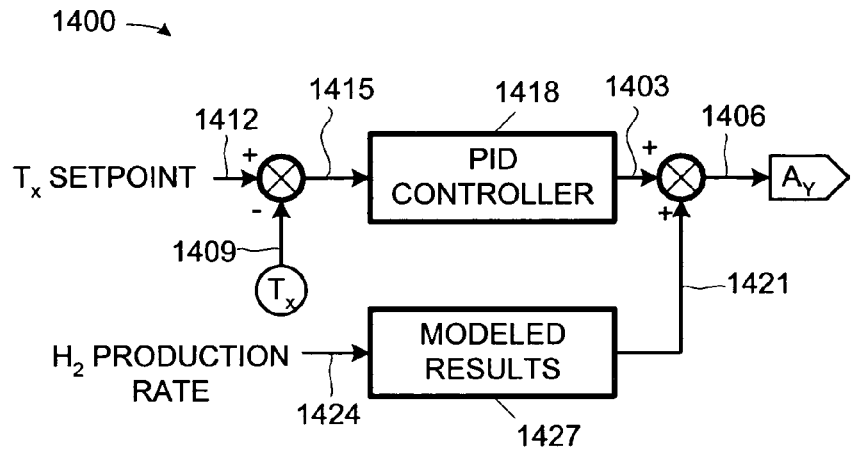
FIG. 14 depicts the operation of a portion of the automated control system of the PHG of FIG. 9.
Figure 15:
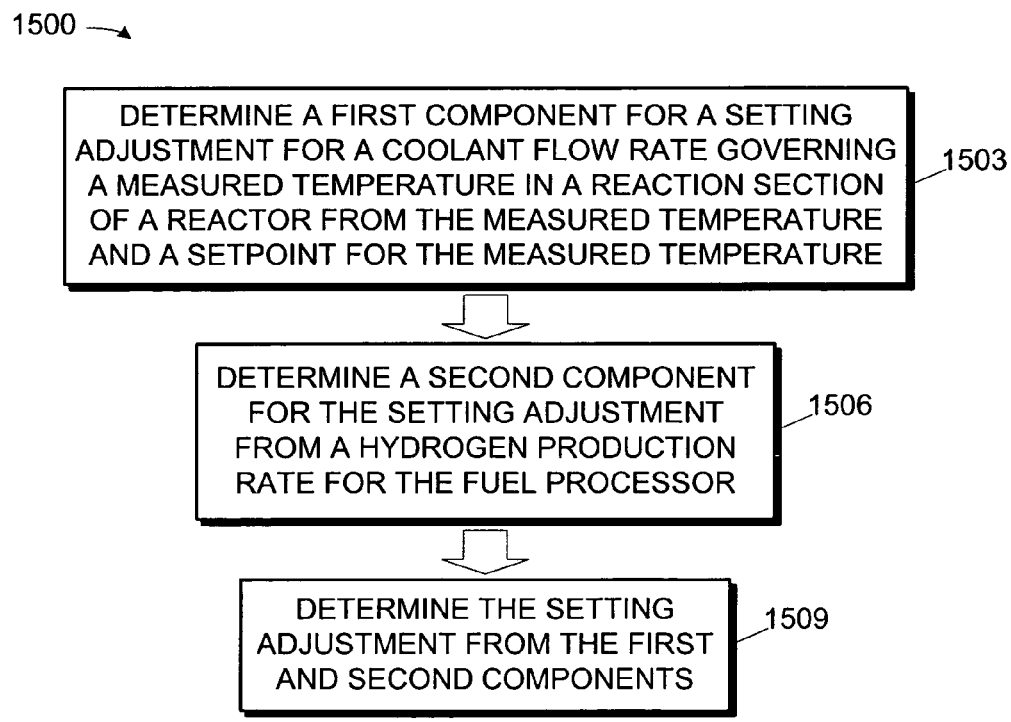
FIG. 15 illustrates one particular embodiment of a method practiced in accordance with another aspect of the present invention.

The implementation of the oxidizer 304' in this particular embodiment changed somewhat from the embodiment discussed above. The change prompted changes in other subsystem designs. The new implementations are shown in FIG. 11A-FIG. 11E, with like parts bearing like numbers. Note that each of these changes can be individually implemented in the respective subsystem managers 504-514, the hardware dependent layer 516, and the compatibility layer 518 as discussed above. The ATR 302 in FIG. 11E is not different from the ATR 302 in FIG. 4F, but the plumbing is different and, in this particular embodiment, a different local control technique, discussed further below relative to FIG. 11E and FIG. 14 -FIG. 15, is used to control the shift bed temperature.

FIG. 12A-FIG. 12D illustrate a startup procedure for the hydrogen generator 900 of FIG. 9. The hydrogen generator 900 is started and operated in sequence where the compressor 904 and PSA 902 each communicate their state to main control manager 502, shown in FIG. 10. Each subsystem 302, 304', 306, 308', 310', 312, 906, all shown in FIG. 9, has its own control algorithm that exchanges operational information with main control algorithm of the master control manager 502 as discussed above relative to the control system 500 of FIG. 5. The modular design of the control algorithms allows for smooth decoupling of physical subsystems should there be a need to test subsystems separately.

The master control manager 502 first begins (at 1203) the pre-startup procedure (at 1206) by turning on the power (at 1209) and running diagnostic routines ("diagnostics", at 1212). If either the power fails to come on (at 1215) or the diagnostics fail (at 1218), then the start-up aborts (at 1221) and the process ends (at 1224). If the power comes on (at 1215) and the diagnostics pass (at 1218), the main control manager 502 proceeds to start-up (at 1227, FIG. 12B) the fuel processor 300'. During start-up, the fuel processor 300' purges (at 1230, 1233) the oxidizer 304' and the ATR 302 with air and recycles (at 1236) the reformate 307, shown in FIG. 9, through the oxidizer 304' from the ATR 302. The fuel processor 300' informs (at 1239) the compressor 904 when the reformate 307 is on specification for the compressor 904 to start, i.e., when the fuel processor 300' is in "run" mode. In the illustrated embodiment, the second level of quality is attained when the reformate 307 comprises CO<1%, $CH_4$<2%, $CO_2$>15% and $H_2$>40% and the compressor 904 suction pressure is set to 0.5 PSIG.

The reformate 307 is then routed (at 1242, FIG. 12C) to bypass the PSA 902 and is then started (at 1245) and ramped up (at 1248). The reformate 307 is routed (at 1251) back to the oxidizer 304' of the fuel processor 300'. This closes the loop again and adds control of the compressor 904 to the overall system 900. This also purges (not shown) the compressor 904 where potential pockets of air are displaced with reformate 307. Starting the compressor 904 after purging the ATR 302 provides compressor purge ensuring that no combustible gas mixtures passes through the compressor 904.

When the reformate 307 reaches specification (at 1254), the master control manager 502 begins the start-up (at 1257, FIG. 12D) for the PSA 902. The PSA 902 runs (at 1260) while maintaining the inlet pressure at the desired level. When the reformate 307 reaches a second level of quality (at 1263) required by the PSA 902 and the compressor 904 is fully pressurized (at 1263), the PSA 902 is signaled (at 1266) to start-up. If the downstream compressor (not shown) is ready (at 1269), then the PSA 902 receives (at 1272) the reformate 307 from the compressor 904 as its feed and the start-up is complete (at 1275). Note that the transition requires supplemental natural gas feed to the oxidizer 304' until the PSA 902 begins to produce off-gas (not shown) that will be used as feed to the oxidizer 304'. The master control manager 502 monitors the compressor 904 startup synchronization to provide the supplemental feed gas to the oxidizer 304' and prevent vacuum from being pulled on the ATR vessel 1103, shown in FIG. 11E. If the downstream compressor is not ready after an hour (at 1278), then the master control manager 502 shuts down (at 1281) the apparatus 900.

More particularly, when the reformate 307 is measured within specification (i.e., CO<1%, $CH_4$<2%, $CO_2$>15% and $H_2$>40%, in the illustrated embodiment), the control system 1000 routes the reformate 307 to the compressor 904 and the compressor 904 is started. The compressor bypass valve (not shown) adjusts the compressor suction pressure to maintain 0.5 PSIG. During the bypass, the compressor 904 discharge pressure is maintained at 150 PSIG. Note that, when the reformate 307 is routed to the PSA 902, the compressor 904 needs to provide enough pressure to flow through the bypass. The master control manager 502 is set to continuously maintain the compressor suction pressure at 0.5 PSIG. Starting the compressor 904 after purging the ATR 302 purges the compressor 904 to ensure that no combustible gas mixtures pass through the compressor 904. The compressor/PSA subsystem 906 returns reformate 307 back to the oxidizer 304' for continuous operation.

The control system 1000 monitors the compressor startup synchronization to provide supplemental feed gas to oxidizer 304' and prevent vacuum from being pulled on the ATR vessel. Once the compressor suction and discharge pressure control is established, the compressor discharge pressure is increased to 215 PSIG. The hydrogen generator 900 operates at this pressure during startup and normal operations. The operation of the compressor 904 is then synchronized with that of the fuel processor 300'.

Once the compressor 904 is up and running, the control system 1000 then synchronizes the operation of the PSA 902 with that of the fuel processor 300' and the compressor 904. Once the reformate 307 is within specification for the PSA 902, the PSA 902 pressurization is started. The product delivery valve (not shown) is maintained closed. In the illustrated embodiment, the specification for the reformate 307 at this point is defined as: CO<1%, $CH_4$<2%, $CO_2$>15% and $H_2$>40%. The inlet pressure is maintained at 215 PSIG. Product tank pressure for the PSA 902 is continuously monitored for rate change. If the rate change deviates significantly from the set pressure, shutdown is initiated for the hydrogen generator 900. Startup for the PSA 902 is complete once the PSA 902 is pressurized.

The control system 1000 now operates the entire hydrogen generator 900 in synchronization as production rates are increased to 100%. The hydrogen generator 900 will ramp up the natural gas feed flow rate to 40 slpm within 20 minutes, the steam to carbon ratio and $O_2$/C ratio are automatically adjusted according to the feed and the ATR feed inlet temperature. The hydrogen generator 900 is then operating in a steady-state, stable run mode.

During the steady state operation, the control system 1000 will continue to adjust the operation of system components by, e.g., consulting lookup tables specifying rates at required purity levels. The control system 1000 maintains the inlet pressure at 215 psig and monitors pressure rate changes. The control system 1000 will continue to monitor the gas exiting PSA 902 to determine the purity of the hydrogen 901. When the hydrogen 901 is on specification, the hydrogen generator 900 will start the delivery of the hydrogen 901 to the downstream system. A signal will be sent to the downstream system (not shown) indicating that hydrogen 901 is ready to be delivered. Upon receiving the confirmation signal from the downstream system, the hydrogen generator 900 will begin delivering the hydrogen 901.

If the hydrogen 901 goes out of specification, the control system 1000 signals the downstream system and suspends delivery. The hydrogen 901 vented to the combustible vent. The control system 1000 automatically attempts to adjust the system components to recover the purity. Once the purity is recovered, delivery to the downstream system resumes.

FIG. 14-FIG. 15 illustrate one particular control technique of the control system 1000 for controlling the shift bed temperature of the ATR 302 of FIG. 11. FIG. 14 conceptually illustrates a control loop 1400 employed by the illustrated embodiment in accordance with the present invention. The settings for each of the variable speed pumps 415-417 is controlled by a respective control loop 1400. The control technique of the present invention employs, in the illustrated embodiment, the complete system modeling effect (the reformer as a whole, including ATR section, ZnO section, shift section, production rate, etc.), develops a dynamic PID control loop to the plant response, and testing data are used to compensate the model offset to improve the robustness of the controller.

More particularly, system modeling takes into account the target hydrogen production rate based upon current flow rates, upstream temperature profiles, reaction stage and shift bed temperature gradient due to heat loss and exothermal reaction effect. A system model for each section of the shift bed can be generated from the reactions that occur upstream, the geometries of the reactor, and the feed to the reactor bed, etc. Various modeling techniques of this type are known to the art, and any suitable modeling technique may be employed. The system modeling is used to generate set points to be used for the temperature control. These set points include the predicted reformate composition, flow rate and temperature that will be entering a particular shift bed section. Thus, the system modeling generates a group of setpoints for the temperatures measured by the temperature sensors $T_1$-$T_4$, shown in FIG. 11E. The system modeling also produces a set of results correlating, for example, the temperatures that may be measured by the temperature sensors $T_1$-$T_4$ and the $H_2$ production rate of the ATR 210.

FIG. 15 illustrates one particular embodiment of a method 1500 practiced in accordance with another aspect of the present invention. More particularly, the method 1500 is a method for use in controlling the reaction temperature of a fuel processor, i.e., the temperature in the shift bed 412, shown in FIG. 4, of the ATR 210, first shown in FIG. 2, of the fuel processor 102, first shown in FIG. 1. The method 1500 is for the control of a temperature in a single location, e.g., the temperature measured by the temperature sensor $T_1$. However, the method 1500 can be applied in serial or in parallel to control the temperature in a plurality of locations throughout the shift bed 412 or elsewhere in the ATR 210. Application of the method 1500 will be illustrated in the context of the control loop 1400, shown in FIG. 14. However, alternative embodiments may implement the method 1500 using control loops of alternative design.

The method 1500 begins by determining (at 1503) a first component 1403 for a setting adjustment 1406 for an actuator governing a measured temperature 1409 in a reaction section of a reactor from the measured temperature 1409 and a setpoint 1412 for the measured temperature. The setpoint 1412 is determined as a part of the modeled results discussed above. The measured temperature 1409 is the temperature measured by the temperature sensor $T_x$ at the point of interest in the shift bed 412, shown in FIG. 4, at which the temperature sensor $T_x$ is disposed. In the illustrated embodiment, the difference 1415 between the setpoint 1412 and the measured temperature 1409 is input to a proportional-integral-derivative ("PID") controller 1418, such as is known in the art. The output of the PID controller 1418 is the first component 1403.

The method 1500 also determines (at 1506) a second component 1421 for the setting adjustment 1406 from a $H_2$ production rate 1424 for the fuel processor 102. In the illustrated embodiment, at least selected portions of the modeled results previously discussed are tabulated in a form indexable by the $H_2$ production rate. Thus, the modeled results 1427 may be, for instance, a look-up table wherein various setting adjustments for the actuator are indexed by the $H_2$ production rate to which they correlate. Note that the modeled results 1427 are typically generate a priori by modeling the operation of the fuel processor 102 in a variety of operating scenarios to obtain this information. Note also that the determination of the first and second components 1403, 1421 may be performed in parallel or in serial.

More particularly, the model (not shown) used by the illustrated embodiment was developed using Aspen Plus and Aspen Custom Modeler. These software packages are commercially available from:

Aspen Technology, Inc.
Ten Canal Park
Cambridge, Mass. 02141-2201
USA
Phone:+1-617-949-1000
Fax:+1-617-949-1030
email:info@aspentech.com However, other suitable modeling software known to the art may be employed in alternative embodiments.

The model has both steady-state and dynamic capabilities. The performance of the fuel processor 300' is estimated by the model from thermodynamic parameters that result in a desired state at the given temperature and pressure. Reaction conversions and compositions are determined from either kinetic data available in literature for such typical reactions or estimated from models based on experiments conducted in the laboratory for specific reactions. The desired $H_2$ purity and flow rate for the reformate 307 are specified and the model calculates natural gas flow, air flow (calculated back from the optimum $O_2$/C ratio), and water flow (calculated back from the optimum Steam/Carbon ratio).

The resulting temperature of the ATR 302 is calculated as the adiabatic temperature rise resulting from minimizing the free energy of the ATR reaction. The composition of reformats is determined by the model (from thermodynamic and reaction parameter estimations). Using this composition, the model then calculates the desired speed needed for the end use from empirical correlations.

The method 1500 then determines (at 1509) the setting adjustment 1406 from the first and second components 1403, 1421. In the illustrated embodiment, the first and second components 1403, 1421 are summed to obtain the setting adjustment 1406, although alternative embodiments may use more sophisticated techniques for the determination. The setting adjustment 1406 is then signaled to the actuator over the line $A_y$. Note that the setting adjustment 1406 may be 0, i.e., no change is needed because the measured temperature 1409 suitable matches the setpoint 1412. However, at any given time, at least one of, and sometimes all of, the first component 1403, the second component 1421, and the setting adjustment 1406 will be non-zero.

Note that, in some circumstances, the first and second components 1403, 1421 could work in opposite directions with one telling a pump to increase flow and the other telling the pump to decrease flow. Thus, in the illustrated embodiment, the two components 1403, 1421 are not given equal weight in controlling the coolant flow. Specifically, the $H_2$ production rate and the information from the look up table, i.e., the second component 1421, is the dominant component. The first component 1403 that is derived from sensed temperatures 1409 and the setpoints 1412, is used to fine tune the pump speed. By way of example, the second component 1421 might instruct a given pump to operate at 50% of capacity, while the first component focuses on the error and may adjust the pump speed by ±5% of capacity.

Figures 13A, 13B:
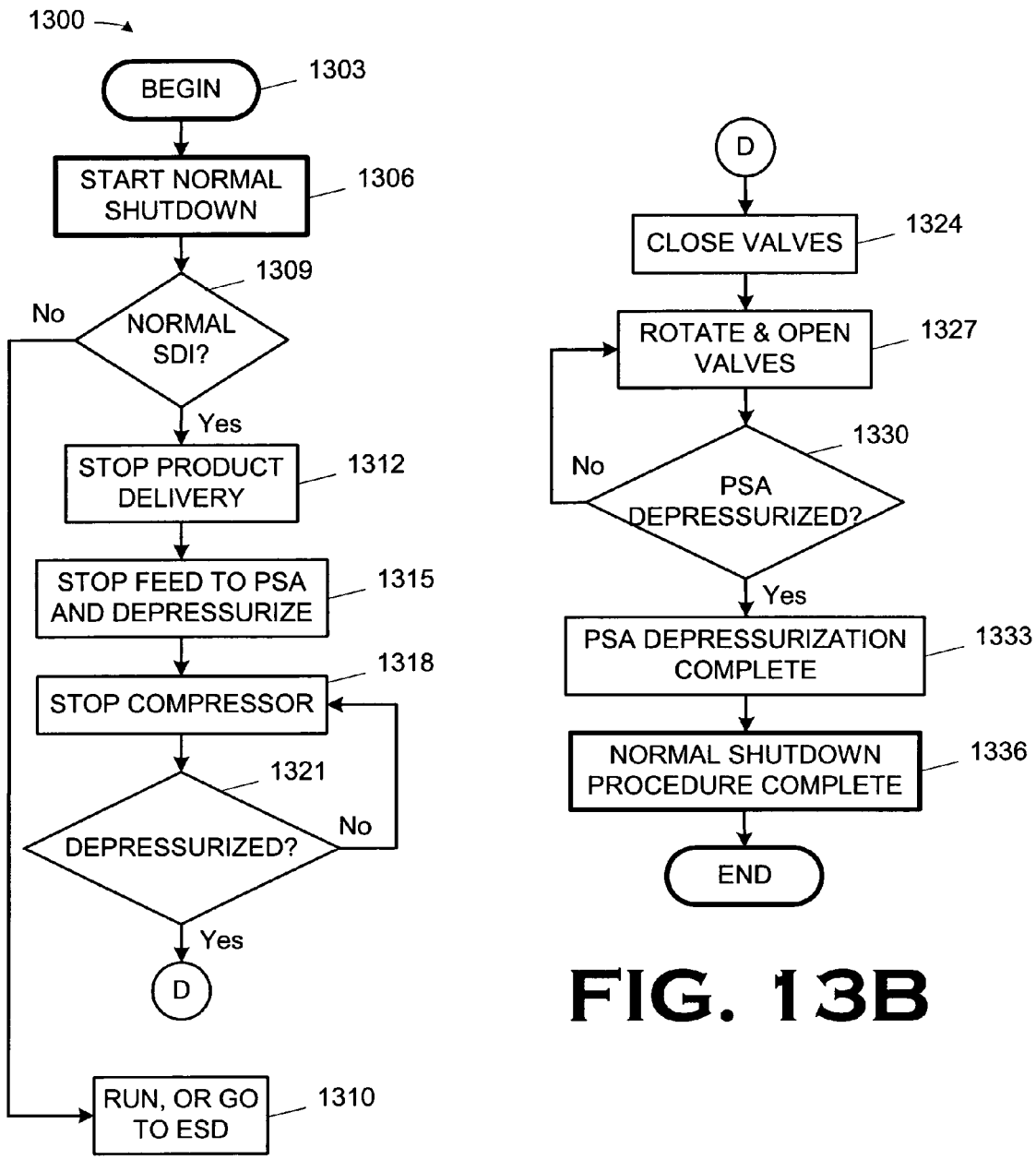
FIG. 13A-FIG. 13B illustrate a shutdown procedure for the apparatus of FIG. 9.

FIG. 13A-FIG. 13B illustrate a shutdown procedure for the hydrogen generator 900 of FIG. 9. The control system 1000 is also capable of initiating automated shutdown when specified conditions are observed. In general, the control system 1000 shuts down the hydrogen generator 900 in either a "normal" shutdown mode or in an "emergency" shutdown ("ESD") mode.

There are three scenarios of normal shutdown mode:
- mode 1—the PSA 902 is shutdown while the compressor 904 and the fuel processor 300' continue to run, but this mode is available only when the rate of change rises above predefined set point;
- mode 2—the PSA 902 and compressor are shutdown and the fuel processor 300' continues to run at 50% rates; and
- mode 3—the PSA 902, compressor, and fuel processor 300' are all shutdown.

Note that these are implementation specific and are neither exclusive nor exhaustive.

FIG. 13A-FIG. 13B illustrate a shutdown procedure 1300 for the hydrogen generator 900 of FIG. 9. The shutdown begins (at 1303) by starting (at 1306) a "normal" shutdown, i.e., mode 2. The discussion on mode 2 below also applies to mode 1 for the depressurization and shut down of the PSA 902. If the shutdown is not a normal shutdown or if there is no shutdown (at 1309), then (at 1310) emergency shutdown begins or the hydrogen generator 900 continues to run, respectively. An emergency shutdown is initiated when critical or otherwise undesirable process conditions are observed. It results in immediate loss of power to all components of hydrogen generator 900.

If the shutdown is a shutdown indicator ("SDI") (at 1309), then delivery of product, i.e., the hydrogen 901, is halted (at 1312), feed to the PSA 902 is halted and the PSA 902 depressurized (at 1315), and the compressor 904 is stopped (at 1318). Once the PSA 902 is depressurized (at 1321), appropriate valving is closed (at 1324) and opened (at 1327) until the PSA 902 is depressurized (at 1330). More particularly, the PSA 902 is made up of multiple chambers wherein purification beds (not shown) reside. Each bed is at a different pressure, if there are for example eight beds, the inlet from the compressor bed is equal to the compressor discharge temperature. Each successive bed is $\frac{1}{8}^{th}$ the pressure of the first bed, with the final bed equal to the discharge pressure to exhaust or the ATO. Thus, you can depressurize the PSA 902, then you need to rotate, or close and open the appropriate valving, until the PSA 902 is depressurized. Once the PSA 902 is depressurized (at 1333), the normal, i.e., mode 2, shutdown is complete (at 1336).

More particularly, during automatic shutdown, the control system 1000 will first signal the fuel processor 300' to ramp down rates to 50% to accommodate oxidizer 304' handling of the reformate 307 return. The control system 1000 then signals the downstream system (not shown) that a shutdown is coming. The control system 1000 then automatically opens and closes appropriate valving to depressurize the PSA 902. Once the PSA 902 is depressurized, the system controller 1000 routes the reformate 307 to the oxidizer 304' and turns off the compressor 904. It then turns off cooler fans 480, shown in FIG. 1D, and closes the compressor bypass with 60 seconds delay after compressor 904 is turned off. This completes normal shutdown, mode 2. Once the shutdown is complete, the control system 1000 will purge the PSA 902 with nitrogen.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling the operation of a purified hydrogen generator, the method comprising:
   - controlling the operation of a hydrogen generator;
   - controlling the operation of a hydrogen purifier; and
   - synchronizing the controlled operation of the hydrogen generator with the controlled operation of the hydrogen purifier by jointly controlling the operation of both the hydrogen generator and the hydrogen purifier.

2. The method of claim 1, wherein controlling the operation of the hydrogen generator includes controlling the operation of at least one of a fuel processor, a pressure swing adsorption unit, and a compressor.

3. The method of claim 1, wherein controlling the operation of the hydrogen generator and controlling the operation of the hydrogen purifier includes:
   - managing the operation of each of a plurality of physical subsystems of the purified hydrogen generator through a respective subsystem manager;
   - directing state transitions of the subsystem managers from a master control manager; and
   - routing interaction between the subsystem managers from the master control manager.

4. The method of claim 1, wherein synchronizing the controlled operation of the hydrogen generator with the controlled operation of the hydrogen purifier includes:
   - managing the operation of each of a plurality of physical subsystems of the purified hydrogen generator through a respective subsystem manager, the physical subsystems including at least one hydrogen generator subsystem and at least one hydrogen purifier subsystem;
   - directing state transitions of the subsystem managers from a master control manager; and
   - routing interaction between the subsystem managers from the master control manager, including interaction between the hydrogen generator subsystem and the hydrogen purifier subsystem.

5. A method for controlling the operation of a purified hydrogen generator comprising a hydrogen generator and a hydrogen purifier, the method comprising:
   - managing the operation of each of a plurality of physical subsystems of the purified hydrogen generator through a respective subsystem manager, the physical subsystems including at least one hydrogen generator subsystem and at least one hydrogen purifier subsystem;

directing state transitions of the subsystem managers from a master control manager; and routing interaction between the subsystem managers from the master control manager, including interaction between the hydrogen generator subsystem and the hydrogen purifier subsystem.

6. The method of claim 5, wherein managing the operation of each physical subsystem includes invoking a control module, an information exchange module, and a control module.

7. The method of claim 6, wherein managing the operation further includes invoking a diagnostics module.

8. The method of claim 5, wherein directing state transitions of the subsystem managers includes directing state transitions:

to an off state;

to at least one operational state from the off state; and to at least one shutdown state from any of the operational states.

9. The method of claim 8, wherein the at least one operational state comprises at least one of:

a manual state into which the subsystem may transition from the off state;

a manager check state into which the subsystem may transition from the off state;

a preheat state into which the subsystem may transition from the manager check state;

a startup state into which the subsystem may transition from the preheat state; and a run state into which the subsystem may transition from the startup state.

10. The apparatus of claim 8, wherein the at least one shutdown state includes at least one of:

a standard shutdown state; and an emergency shutdown state.

* * * * *